(12) United States Patent
Morton et al.

(10) Patent No.: US 7,512,404 B2
(45) Date of Patent: Mar. 31, 2009

(54) METHOD AND APPARATUS FOR SECTOR CHANNELIZATION AND POLARIZATION FOR REDUCED INTERFERENCE IN WIRELESS NETWORKS

(75) Inventors: John Jack Morton, Austin, TX (US); Ben Jones, Austin, TX (US); Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 39 days.

(21) Appl. No.: 10/858,936

(22) Filed: Jun. 1, 2004

(65) Prior Publication Data

US 2004/0259563 A1 Dec. 23, 2004

Related U.S. Application Data

(60) Provisional application No. 60/492,017, filed on Aug. 1, 2003.

(51) Int. Cl.
*H04Q 7/20* (2006.01)
(52) U.S. Cl. .................. 455/450; 455/452.2
(58) Field of Classification Search ......... 455/450–453, 455/509–514
See application file for complete search history.

(56) References Cited

U.S. PATENT DOCUMENTS

| | | | |
|---|---|---|---|
| 5,164,942 A | | 11/1992 | Kamerman et al. |
| 5,515,378 A | | 5/1996 | Roy, III et al. |
| 5,553,316 A | | 9/1996 | Diepstraten et al. |
| 5,666,654 A | * | 9/1997 | Kanai .................. 455/512 |
| 5,835,859 A | * | 11/1998 | Doner .................. 455/447 |
| 5,946,631 A | | 8/1999 | Melnik |
| 6,140,972 A | | 10/2000 | Johnston et al. |
| 6,218,990 B1 | | 4/2001 | Grangeat et al. |
| 6,236,866 B1 | | 5/2001 | Meyer et al. |
| 6,323,810 B1 | | 11/2001 | Poilasne et al. |
| 6,470,183 B1 | * | 10/2002 | Herrig .................. 455/450 |
| 6,633,769 B2 | | 10/2003 | Shoobridge |

(Continued)

FOREIGN PATENT DOCUMENTS

EP 0559980 A1 9/1993

(Continued)

OTHER PUBLICATIONS

Current Claims of International Patent Application PCT/US 03/36179 (7 pgs), no date listed.

(Continued)

*Primary Examiner*—Charles N Appiah
*Assistant Examiner*—Jaime M Holliday
(74) *Attorney, Agent, or Firm*—Hickman Palermo Truong & Becker LLP

(57) ABSTRACT

The present invention provides in one embodiment channel allocation and polarization techniques for reducing cross sector communications interference in a multiple access wireless communications environment. In one embodiment, channel allocation and/or polarization techniques may be applied in multiple-access wireless communications architectures to provide selective, simultaneous communications with wireless devices using a plurality of transmitters. In some embodiments, a transmitter is coupled to an antenna configured to provide simultaneous communications with wireless devices located in different spatial areas or sectors. In some embodiments, communications between wireless devices within a single sector, between wireless devices in different sectors and between wireless devices and a wired network or wireless backhaul network may be provided.

36 Claims, 15 Drawing Sheets

U.S. PATENT DOCUMENTS

| | | | |
|---|---|---|---|
| 6,687,503 | B1 | 2/2004 | Porter et al. |
| 6,990,338 | B2 | 1/2006 | Miller et al. |
| 2001/0044308 | A1 | 11/2001 | Klank |
| 2002/0107024 | A1 | 8/2002 | Dev Roy |
| 2003/0054829 | A1 | 3/2003 | Moisio |
| 2003/0064745 | A1 | 4/2003 | Benveniste |
| 2003/0078049 | A1 | 4/2003 | Klank |
| 2003/0087645 | A1* | 5/2003 | Kim et al. .................. 455/453 |
| 2003/0210665 | A1 | 11/2003 | Salmenkaita et al. |
| 2004/0095907 | A1 | 5/2004 | Agee et al. |
| 2004/0102222 | A1 | 5/2004 | Skafidas et al. |
| 2004/0203873 | A1 | 10/2004 | Gray |
| 2004/0204114 | A1 | 10/2004 | Brennan et al. |
| 2004/0259558 | A1 | 12/2004 | Skafidas et al. |
| 2005/0141545 | A1 | 6/2005 | Fein et al. |
| 2005/0181723 | A1 | 8/2005 | Miller et al. |
| 2006/0009226 | A1* | 1/2006 | Vicharelli et al. ........... 455/450 |
| 2006/0025150 | A1 | 2/2006 | Kim et al. |

FOREIGN PATENT DOCUMENTS

| | | | |
|---|---|---|---|
| EP | 1 096 730 A1 | | 5/2001 |
| EP | 1156689 A1 | * | 11/2001 |
| EP | 1 231 807 A2 | | 8/2002 |
| WO | WO 97/14259 | | 4/1997 |
| WO | WO 98/24258 | | 6/1998 |
| WO | WO 98/24258 A2 | | 6/1998 |
| WO | WO 01/39538 A1 | | 5/2001 |
| WO | WO 02/05382 A1 | | 1/2002 |
| WO | WO 02/41449 A2 | | 5/2002 |
| WO | WO 03/026221 A1 | | 3/2003 |
| WO | WO 2004/049747 A2 | | 6/2004 |

OTHER PUBLICATIONS

International Preliminary Examining Authority, Written Opinion, Patent Application PCT/US 03/36179, dated Feb. 7, 2005, 11 pages.
Current Claims of International Patent Application PCT/US 03/36179 (9 pgs), no date listed.
International Preliminary Examining Authority, International Preliminary Examination Report, Patent Application PCT/US 03/36179, dated May 5, 2005, 13 pages.
Mark J. Vaughan, et al., "InP-Based 28 GHz Integrated Antennas for Point-to-Multipoint Distribution", High Speed Semiconductor Devices and Circuits, Cornell University, Ithaca, NY, Aug. 7, 1995, pp. 75-84.
Benenson, L S., et al., "Decoupling of Antennas by Means of Periodic Structures", Soviet Journal of Communications Technology and Electronics, Scripta, vol. 37, No. 8, 1992, pp. 23-33, no month listed.
International Searching Authority, "Invitation to Pay Additional Fees," international application No. PCT/US2004/023949, dated Apr. 25, 2005, 6 pages.
Current Claims, PCT/US2004/023949, 14 pages, no date listed.
Gomes, Fernando C., "Reactive GRASP with Path Relinking for Channel Assignment in Mobile Phone Networks," XP-001099662, pp. 60-67, no date listed.
International Searching Authority, "Notification of Transmittal of the International Search Report and the Written Opinion of the International Searching Authority, or the Declaration," International Application No. PCT/US2004/023901, dated Jul. 5, 2005, 21 pages.
Current Claims, PCT/US2004/023901, pp. 1-14, no date listed.
International Searching Authority, "Notification of Transmittal of the International Search Report and the Written Opinion of the International Searching Authority, or the Declaration," PCT/US2004/023949, dated Jun. 28, 2005, 22 pages.
International Searching Authority, "Notification of Transmittal of the International Search Report and the Written Opinion of the International Searching Authority, or the Declaration," PCT/US2004/023901, dated Jul. 7, 2005, 21 pages.
PCT Inernational Bureaum, "Notification Concerning Transmittal of International Preliminary Report of Patentability (Chapter 1 of the Patent Cooperation Treaty)," PCT/US2004/023949, dated Feb. 16, 2006, 12 pages.
Current Claims, PCT/US2004/023949, 14 pages.
European Patent Office, "Extended European Search Report", EP Application No. 060140530.0-2416, dated Dec. 21, 2006, 13 pgs.
Current Claims, EP Application No. 06014053.0-2416, 11 pgs.
European Patent Office, "Communication Pursuant to Article 96(2) EPC," App. No. 04801902.0, dated Sep. 1, 2006, 8 pages.
Current Claims, EP App. No. 04801902.0, 14 pages.
Stern, Jim H., "Fixed Cell Assignments for Forward Link in Broadband Wireless Networks," 2000, IEEE, pp. 1-6.
European Patent Office, "Communication pursuant to Article 96(2) EPC," EP App. 03783375.3 (52637-0073), dated Apr. 4, 2007, 7 pages.
Claims for EP App. 03783375.3 (52637-0073), 8 pages.
Current Claims, EP App. No. 04801902.0, 14 pages, 2006.
Current Claims, EP Application No. 06014053.0-2416, 11 pgs, 2006.
Claims for EP App. 03783375.3 (52637-0073), 8 pages, 2007.
International Searching Authority, "Invitation to Pay Additional Fees," May 25, 2004, 5 pages.
Current Claims in PCT patent application, International Application No. PCT/US03/36179, 7 pages.
Kou Kobayashi et al., "Spatially Divided Channel Scheme using Sectored Antennas for CSMA/CA—'Directional CSMA/CA'," IEEE, vol. 1, Sep. 18, 2000, XP010520636, pp. 227-231.
Asis Nasipuri et al., "Power Consumption and Throughput in Mobile Ad Hoc Networks using Directional Antennas," IEEE, Oct. 14, 2002, XP010610949, pp. 620-626.
Bill McFarland et al., "A 2.4 & 5 GHz Dual Band 802.11 WLAN Supporting Data Rates to 108 Mb/s," IEEE, Oct. 20, 2002, XP010616113, GAAS IC Symposium, 24th Annual IEEE Gallium Arsenide Integrated Circuit Symposium, Technical Digest 2002, Monterey, CA, Oct. 20-23, 2002, pp. 11-14.

* cited by examiner

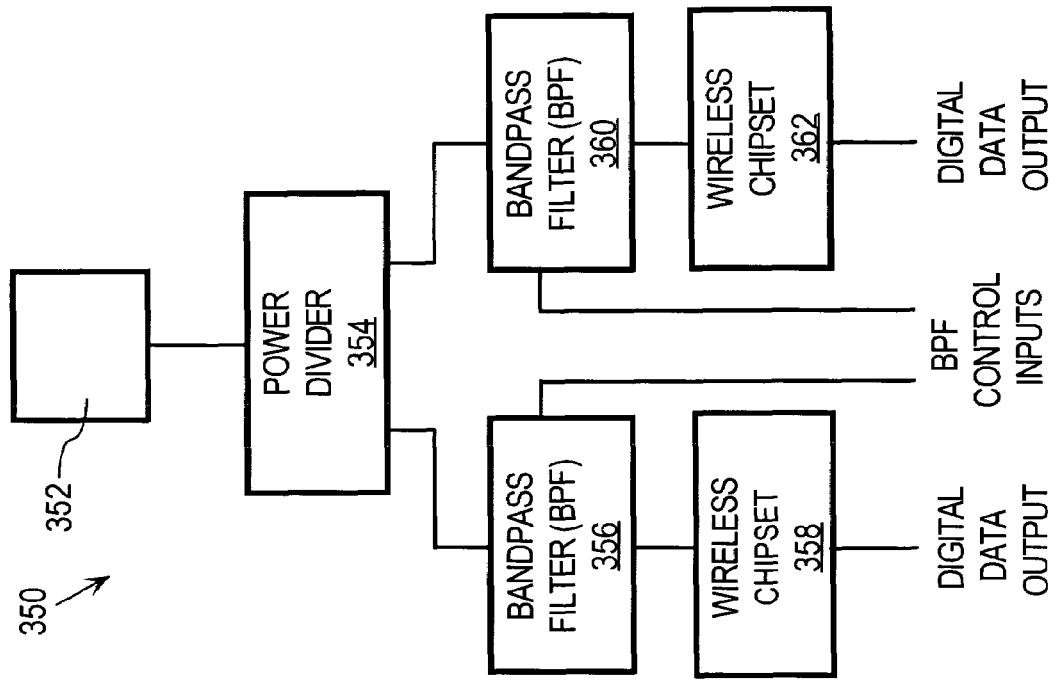
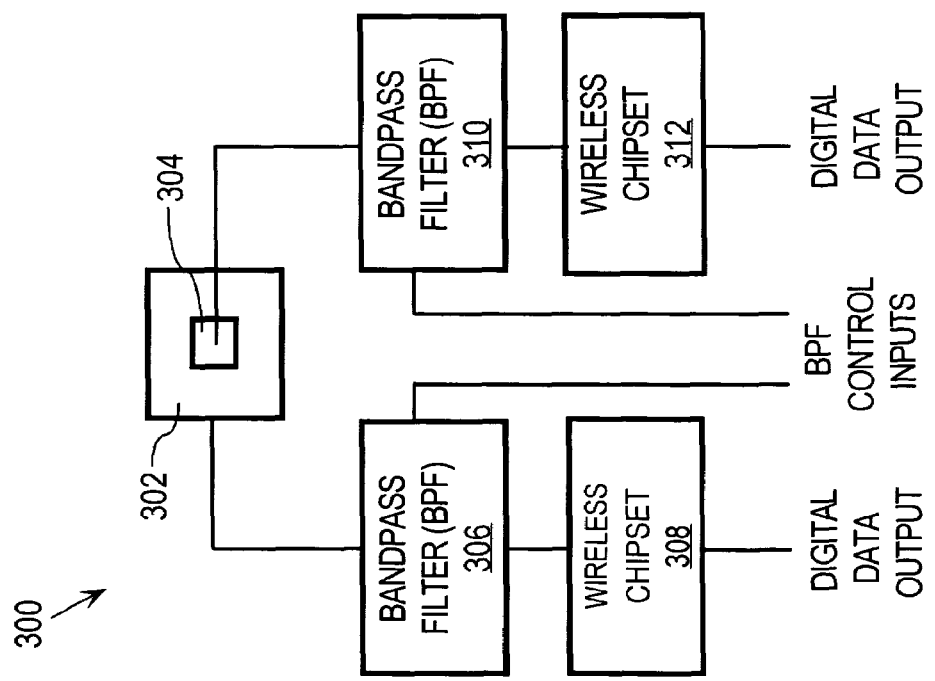
FIG. 3B
FIG. 3A

631 DETERMINE OVERALL INTERFERENCE GENERATED BY EACH ONE OF THE PLURALITY OF CANDIDATE CHANNEL TO TRANSMITTER ASSIGNMENTS

632 CHOOSE A CANDIDATE CHANNEL TO TRANSMITTER ASSIGNMENT THAT MINIMIZES OVERALL INTERFERENCE

RETURN

METHOD AND APPARATUS FOR SECTOR CHANNELIZATION AND POLARIZATION FOR REDUCED INTERFERENCE IN WIRELESS NETWORKS

RELATED APPLICATIONS AND CLAIM OF PRIORITY

This application claims the benefit of a U.S. Provisional Patent Application No. 60/492,017 entitled, "Wireless Communication Architecture," filed Aug. 1, 2003, the contents of which are incorporated herein by reference in its entirety for all purposes.

This application is related to U.S. Non-provisional Patent Application No. 10/615,208, entitled, "Multiple Access Wireless Communications Architecture," filed Jul. 7, 2003 and subsequently issued on Jul. 24, 2007 as U.S. Pat. No. 7,248,877 B2, which claims priority from U.S. Provisional Patent Application No. 60/428,456, entitled "Approach For Using Spatial Division To Increase Throughput In A Wireless Communications System," filed Nov. 21, 2002, the contents of which are incorporated herein by reference in its entirety for all purposes.

FIELD OF THE INVENTION

This invention relates generally to wireless communications systems and, more specifically, to selection of number of sectors, channel allocation and polarization techniques for reducing interference and increasing network performance in a wireless communications architecture.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A communications network is any system or mechanism that provides for the exchange of information or data between participants. In existing wireless communications networks, such as a wireless Local Area Networks (LANs) or Personal Area Networks (PANs), a wireless access point functions as a transceiver in communicating with a number of wireless devices. As used herein, the term "wireless device" refers to any type of device that uses a wireless communications protocol to communicate. Example wireless devices include, without limitation, desktop, laptop and handheld computers, Personal Digital Assistants (PDAs), cell phones and various other portable devices. The radiation pattern of wireless access points is usually omni directional, i.e., the wireless access point transmits information in 360 degrees, so that all wireless devices within range of the wireless access points receive all transmitted signals. Wireless access points also perform various management functions, such as selecting specific frequencies on which to transmit data to particular wireless devices in the system.

One ongoing issue with wireless communications architectures is how to increase the number of wireless devices that can simultaneously communicate within a specified physical area given a fixed amount of allocated electromagnetic spectrum. This is particularly important when a number of wireless devices in the specified area are attempting to simultaneously communicate with a wireless access point to access a communications network, such as the Internet. For example, it is not uncommon for large numbers of users to use laptop computers to access the Internet during tradeshows and conferences. As another example, in some corporate offices, many users share wireless access points to access the Internet with laptop computers. As yet another example, many coffee shops now offer free wireless Internet access to customers. All of these situations strain the available access resources since only a limited number of available communications channels must be shared by all participants. For example, the IEEE 802.11(b)/(g) standard in the FCC regulatory domain, sometimes referred to as "WiFi", defines 11 communications channels. Thus, assuming that each channel is dedicated to a single user, only 11 users can communicate simultaneously.

Conventional approaches for addressing this problem include employing multiple access communications protocols to increase the number of wireless devices that can simultaneously access a wireless access point. Example multiple access communications protocols include, without limitations, Frequency Division Multiple Access (FDMA), Time Division Multiple Access (TDMA), Code Division Multiple Access (CDMA) and Carrier Sense Multiple Access (CSMA). The use of multiple access communications protocols can significantly increase the number of wireless devices that can operate simultaneously on a specified set of communications channels. For example, the use of TDMA can triple the number of wireless devices that can share a specified set of communications channels compared to FDMA. Even using TDMA however, a wireless access point can communicate to only one wireless device in any one timeslot. Furthermore for any wireless device to communicate to another wireless device or to the wired network, it must transmit its data to the wireless access point. The wireless access point then transmits the data to another wireless device or to the wired infrastructure, such as the Internet. The throughput of the network is therefore necessarily limited by the throughput of communications between the wireless access point and any one wireless device at a particular point in time. Consequently, in existing systems, the amount of data that can be transferred at any one timeslot is equal to the throughput of the link from the wireless access point to the particular wireless device to which it is communicating. All other wireless devices are in a state waiting for a free time slot to transmit or receive a quantum of data.

Cross-channel interference is another issue confronting conventional approaches. In the previously described example of the IEEE 802.11(b) standard in the FCC regulatory domain, the 11 communications channels often overlap one another. Thus, assuming that two users are each using different but overlapping channels, the two users' communications could interfere with one another.

Management and growing of networks of Wireless Access Points is a complicated process. Adding another wireless access point generally requires one to adjust the power and channel assignments of access points in the vicinity of a new access point in order to avoid interference.

Based on the foregoing, there is a need for a wireless communications architecture that does not suffer from limitations in prior approaches. There is a particular need for a wireless communications architecture that allows a greater number of wireless devices to communicate substantially simultaneously with little or no interference.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram that depicts a wireless communications architecture configured in accordance with an embodiment of the invention.

FIG. 3B is a block diagram that depicts a wireless communications architecture configured in accordance with an embodiment of the invention.

DETAILED DESCRIPTION OF THE INVENTION

Figure 1A:
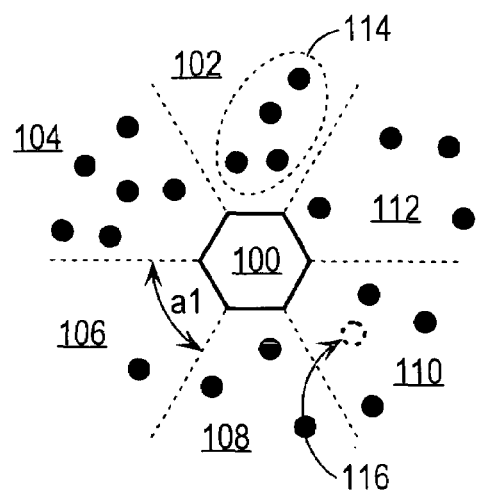
FIGS. 1A-1G are functional diagrams of a wireless communications apparatus configured in accordance with an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
    II. OPERATIONAL OVERVIEW
    III. WIRELESS COMMUNICATIONS APPARATUS
    IV. COMMUNICATIONS CHANNELS, PROTOCOLS AND MULTIPLE ACCESS SCHEMES
    V. INTERFERENCE MITIGATION AND POWER CONTROL
    VI. ANTENNA CONFIGURATIONS
    VII. IMPLEMENTATION MECHANISMS, ALTERNATIVES & EXTENSIONS

I. Overview

As described in this disclosure, in one embodiment, a sectorized access point with the capability to tailors its configuration can provide the ability to reduce network disruption and to also increase network performance.

The present invention provides in one embodiment channel allocation and polarization techniques for reducing interference in a wireless communications environment. In one embodiment, channel allocation and/or polarization techniques may be applied in multiple-access wireless communications architectures to provide selective, substantially simultaneous communications with wireless devices. In some embodiments, channels may be assigned to a plurality of transmitters to establish selective, substantially simultaneous wireless communications with devices. In some embodiments, a transmitter is coupled to an antenna configured to provide selective, substantially simultaneous communications with wireless devices located in different spatial areas. In some embodiments, communications between wireless devices within a single sector, between wireless devices in different sectors and between wireless devices and a wired network or wireless backhaul network may be provided. As used herein, the term "sector" refers to a portion or section of a spatial area in which wireless communications may be established. In one embodiment, the wireless communications architecture includes a wireless device that allocates channels to sectors to increase capacity and reliability of a wireless communication system.

In one embodiment, the wireless communications architecture comprises a frequency channel allocation technique that can enable reduced interference in a wireless LAN. In one embodiment, the wireless LAN employs the IEEE 802.11 protocol. In one embodiment, the wireless LAN is sectorized or apportioned into six (6) unique sector-ordered channel sets that provide reduced sector-to-sector interference for typical antenna radiation patterns. In one embodiment, polarization techniques may be used to reduce sector-to-sector interference. Two sector-ordered cross-polarization schemes provide reduced interference in one example embodiment.

In one embodiment, a method for determining an assignment of wireless communications channels to a plurality of wireless communications transmitter is provided. The method includes determining a plurality of available wireless communications channels. The wireless communications channels may be determined in a frequency band or bands of interest. Determining a plurality of wireless communications channel assignments based upon the plurality of available wireless communications channels and a number of wireless communications transmitters in the plurality of wireless transmitters is also included in the method. The method further includes selecting from the plurality of wireless communications channel assignments, a particular wireless communications channel assignment that provides less interference relative to other wireless communications channel assignments in the plurality of wireless communications channel assignments. In one embodiment, the device chooses number of channels to allocate to the given sectors such as to increase capacity and reliability of a wireless communication system.

In one embodiment, available wireless communications channels may be determined from frequencies in a band of interest, such as without limitation a frequency band selected to work with one of the IEEE 802.11(a), (b), (g), the 802.15 (x), 802.16(x) and 802.20(x) wireless communications specifications, for example. Some embodiments will use frequency bands other than the frequency bands specified by these wireless communications standards.

In one embodiment, the method includes determining a power for each wireless communications channel assignment. In one embodiment, the step of selecting from the plurality of wireless communications channel assignments, a particular wireless communications channel assignment that provides less interference relative to other wireless communications channel assignments in the plurality of wireless communications channel assignments includes selecting from the plurality of wireless communications channel assignments, a particular wireless communications channel assignment that provides less interference relative to other wireless communications channel assignments in the plurality of wireless communications channel assignments and satisfies a power criteria for each of the plurality of wireless communications channel assignments. Power criteria such as without limitation exceeding a specified threshold, providing a greatest power relative to other wireless communications channel assignments, and the like may be used.

In one embodiment, the method includes determining a channel separation for each of the plurality of wireless communications channel assignments. In one embodiment, the step of selecting from the plurality of wireless communications channel assignments, a particular wireless communications channel assignment that provides less interference relative to other wireless communications channel assignments in the plurality of wireless communications channel assignments includes selecting from the plurality of wireless communications channel assignments, a particular wireless communications channel assignment that provides less interference relative to other wireless communications channel assignments in the plurality of wireless communications channel assignments and satisfies a channel separation criteria for each of the plurality of wireless communications channel assignments. Separation criteria such as without limitation a minimum separation between channels assigned to adjacent transmitters, minimum channel separation between channels assigned to adjacent spatial regions in which wireless communications is conducted and the like may be used.

In one embodiment, selecting from a plurality of wireless communications channel assignments a particular wireless communications channel assignment that provides less interference relative to other wireless communications channel assignments in the plurality of wireless communications channel assignments includes determining a reduced interference cost.

In another aspect, one embodiment provides a method for determining an assignment of wireless communications channels to a plurality of wireless communications transmitters. The method comprises determining available wireless communications channels, which in one embodiment, includes selecting a first plurality of sets of wireless communications channels from a band of wireless communications frequencies; determining a power for each set of the first plurality of sets of wireless communications channels; ordering the first plurality of sets of wireless communications channels by power to form an ordered plurality of sets of wireless communications channels; and selecting from the ordered plurality of sets of wireless communications channels, sets of wireless communications channels that satisfy a power criteria to form a second plurality of sets of wireless communications channels. The method further includes determining channel to transmitter assignments, which in one embodiment, includes for each set of the second plurality of sets of wireless communications channels, determining each possible assignment of channels in the set to transmitters; for each possible assignment of channels in the set to transmitters, determining a separation between the channels; for each possible assignment of channels in the set to transmitters, determining whether the separation satisfies a specified separation criteria; and adding possible assignment of channels in the set to transmitters to a plurality of candidate channel to transmitter assignments, if the possible assignment of channels in the set to transmitters satisfies the specified separation criteria. The method also includes selecting a channel to transmitter assignment, which in one embodiment includes determining an overall interference generated by each one of the plurality of candidate channel to transmitter assignments and choosing a candidate channel to transmitter assignment that reduces the overall interference.

In one embodiment, providing adjacent transmitters or sectors with opposite polarization enables reduction of adjacent transmitter/sector interference. In one embodiment, wireless communications transmitters are arranged according to a circular arrangement and adjacent wireless communications transmitters are polarized according to a particular scheme. In one embodiment, sectors are arranged according to a circular arrangement and adjacent sectors are polarized according to a particular scheme. Example polarization schemes used in some embodiments include, but are not limited to, a cyclic rotation scheme, a reverse indexing scheme or a cyclic rotation and reverse indexing scheme. In one embodiment, wireless communications transmitters are grouped into groups and each the groups are provided with opposite polarization. In one embodiment, wireless communications transmitters within each group have congruent polarization. In one embodiment, sectors are grouped into sector groups and adjacent sector groups are provided with opposite polarization. In one embodiment, sectors within each sector grouping have congruent polarization. In one embodiment, the device determines that a channel or set of channels is allocated to other access points in the vicinity and avoids using that channel or set of channels such as to avoid interfering with those access points.

In other aspects, the invention encompasses a computer apparatus and a computer-readable medium configured to carry out the foregoing steps.

In another aspect, the present invention provides in one embodiment, a wireless access point. The wireless access point may include an antenna configured to send and receive communications signals on a first communications channel within a first section of a spatial area on a first frequency and to send and receive communications signals on a second communications channel within a second section of the spatial area on a second frequency. The wireless access point may further include a management mechanism configured to assign the first and second frequencies to the first and second spatial areas in accordance with a channel sector assignment determined from a set of potential channel to sector assignments for available channels by selecting one of the channel to sector assignments having a lower overall interference relative to other channel to sector assignments.

In one embodiment, the management mechanism of the wireless access point is further configured to assign varying polarization to each of the first and second sections, thereby enabling reduced interference between the first section and the second section.

In one embodiment the backhaul link is chosen first and then the channel allocation is determined for the sectors such as to ensure adequate performance of the distribution network.

In some embodiments, the wireless communications architecture generally includes two or more wireless antenna arrangements that are each configured to provide communications with wireless devices located in a particular sector. Each wireless antenna arrangement is further configured to determine whether signals are being communicated on a communications channel before transmitting on the communications channel. This may be implemented, for example, using a carrier sense or energy detection mechanism. Wireless devices within a sector may communicate on the same or different communications channels, depending upon the particular multiple access protocol employed. For example, TDMA or CSMA may be used to allow wireless devices in a sector to share communications channels. Communications channels may also be used simultaneously in different sectors by different wireless devices.

Some embodiments may assign frequencies to transmitters and/or sectors in accordance with a computational channel to sector assignment determined to provide reduced interference. Some embodiments may provide improved communications channel isolation using cross-polarizing techniques. Some embodiments employing interference reduction techniques may achieve increases in aggregate data rate for a sectored deployment and/or increases in the range for each sector. Some embodiments may provide the ability to set the number of independent channels on a sectorized access point. Some embodiments may provide for allocating channels to sectors such as to avoid or stop interfering with access points and to avoid interference from other noise source.

II. Operational Overview

FIG. 1A is a block diagram of a wireless communications apparatus 100 configured in accordance with an embodiment of the invention. Apparatus 100 is configured to allow selective communications with wireless devices located in sectors identified by reference numerals 102, 104, 106, 108, 110 and 112. As depicted in FIG. 1A, each sector 102-112 includes one or more wireless devices. For example, sector 102 includes four wireless devices identified generally by reference numeral 114.

According to one embodiment of the invention, each sector 102-112 is a portion or section of a spatial area around apparatus 100. Each sector 102-112 may be defined by a specified angle with respect to apparatus 100. For example, sector 106 is an area defined by an angle a1, with respect to apparatus 100. Sectors 102-112 may be defined by the same angle, or different angles. In the present example, sectors 102-112 are each defined by an angle of sixty degrees. Each sector 102-112 may also be defined by radius with respect to apparatus 100.

Apparatus 100 is configured to allow selective communications with wireless devices in any number of sectors and the sectors do not need to be contiguous or provide complete coverage around apparatus 100. The number, location and size of sectors 102-112 may be selected based upon a wide variety of configuration criteria, depending upon the requirements of a particular implementation. Also, the size of sectors 102-112 may be the same, or vary, depending upon the requirements of a particular implementation. Example configuration criteria include, without limitation, the expected numbers and locations of wireless devices and physical constraints of a particular implementation. For example, when implemented in a building to provide wireless access to a network, the number and locations of wireless devices that will require wireless access to the network may be considered. Also, the locations of walls and other physical obstacles, as well as the locations of noise sources and other wireless access apparatus may also be considered. In outdoor applications, the types and locations of natural obstacles as well as buildings and other interference sources may be considered.

Figure 1B:
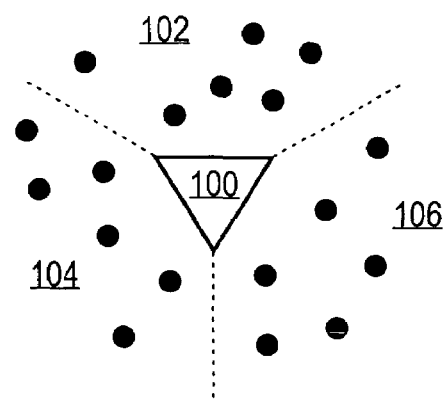
Figure 1C:
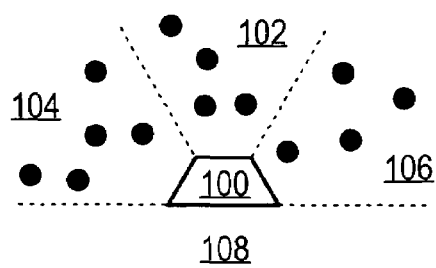
Figure 1D:
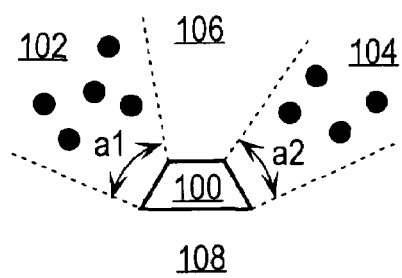

FIGS. 1B-1D depict example configurations for apparatus 100 to allow selective communications with wireless devices located in different sectors. Specifically, FIG. 1B is a block diagram of apparatus 100 configured to allow selective communications with wireless devices located in three sectors 102-106. FIG. 1C is a block diagram of apparatus 100 also configured to allow selective communications with wireless devices located in three sectors 102-106. In FIG. 1C, however, sectors 102-106 are located on one side of apparatus 100. This configuration may be used, for example, in situations where coverage is only desired in sectors 102-106 as depicted in FIG. 1C. One example situation is where apparatus 100 is physically located within a building in a location where wireless devices will only be located in sectors 102-106 as depicted in FIG. 1C with respect to apparatus 100. FIG. 1D is a block diagram of apparatus 100 configured to allow selective communications with wireless devices located in two sectors 102, 104, but not in sectors 106, 108. Sectors 102, 104 are generally angular-shaped areas defined by angles a1 and a2, respectively. This configuration may be used, for example, in situations where it is known that wireless devices are to be located in sectors 102, 104, but not in sectors 106, 108. As depicted in FIG. 1D, apparatus 100 may be configured to allow selective communications in any number of sectors, of varying sizes and locations.

Wireless communications environments often change over time. Changes may be attributable to the introduction of new noise sources or to mobile wireless devices changing locations over time. For example, in FIG. 1A, suppose that a mobile wireless device 116 moves from sector 108 to sector 110. As described in more detail hereinafter, apparatus 100 is configured to automatically detect that the move has occurred and to re-assign mobile wireless device 116 from sector 108 to 110 and perform any required updates of configuration data and data structures maintained by apparatus 100. A frequency or timeslot assigned the mobile wireless device 116 may also be changed, depending upon the requirements of a particular application. In CSMA applications, this may not be required, since mobile wireless device 116 will automatically sense when it can begin communicating in sector 110.

According to one embodiment of the invention, the configuration of apparatus 100 may be dynamically changed over time to change one or more attributes of sectors 102-112. This may include, for example, increasing or decreasing the number of sectors and/or changing the size or shape of existing sectors. The configuration of apparatus 100 may be changed for any reason. For example, apparatus 100 may be moved to a different physical location, where it is desirable to change the location or size of the sectors to provide better coverage. As another example, wireless devices may move to different locations over time.

Figure 1E:
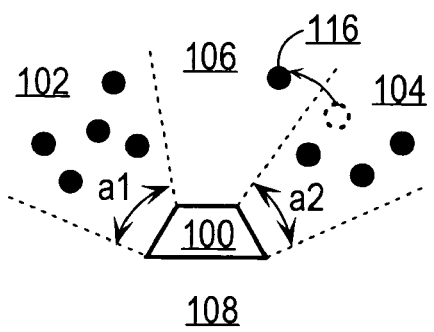
Figure 1F:
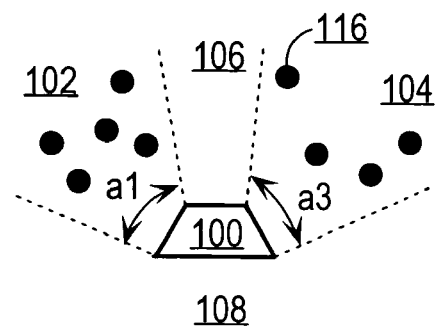

FIG. 1E is a block diagram similar to FIG. 1D, except that a wireless device 116 has moved from sector 104 to sector 106. Since apparatus 100 is not configured to allow wireless communications in sector 106, wireless device 116 no longer has wireless communications supported by apparatus 100. As depicted in FIG. 1F, the configuration of apparatus 100 is dynamically changed to expand sector 104 to provide wireless communications for wireless device 116. The angle of sector 104 has been changed from a2, as depicted in FIG. 1E, to a3, as depicted in FIG. 1F.

Sectors may be dynamically changed to address other conditions, for example for load balancing purposes. In this situation, the size (angle) of sectors are changed to increase or decrease the number of wireless devices in particular sectors to provide better load balancing, thereby increasing throughput. Sectors may also be sub-divided into multiple sub-sectors, to further reduce the number wireless devices in any particular sub-sector. Sectors may also be overlapped, for example using different communications channels, to reduce the number of wireless devices operating on any particular communications channel.

The aforementioned reconfiguration of apparatus 100 may be performed using a variety of techniques, depending upon the requirements of a particular implementation. For example, the physical configuration of one or more antenna elements may be changed to change the size or shape of corresponding sectors. Changing the physical configuration of an antenna element may include several things, such as moving or re-orienting the antenna element, making physical adjustments to or re-sizing the antenna element, or even exchanging the antenna element with a different antenna element.

Instead of changing the physical configuration of an antenna element, the reconfiguration of apparatus 100 may be done by changing the electrical configuration of the apparatus 100 to change the associated sectors, for example using a beam forming network. The beam forming network may be configured to vary the amplitude and relative phase on each beam forming element to change the attributes of the beam, e.g., to create narrow or wide beams and to change the direction of the beams. Varactors may be used for this purpose. A point coordinator function or a distributed coordinator function may be used.

Instead of changing the physical configuration of an antenna element, the reconfiguration of apparatus 100 may be done by changing the electrical configuration of the apparatus 100 to change the associated sectors, for example by allocating the same channel frequency to adjacent sectors. This may be performed by either a power dividing network at the radio frequency level or utilizing a protocol such as CSMA or other point coordination function at the software level.

III. Wireless Communications Apparatus

Figure 2:
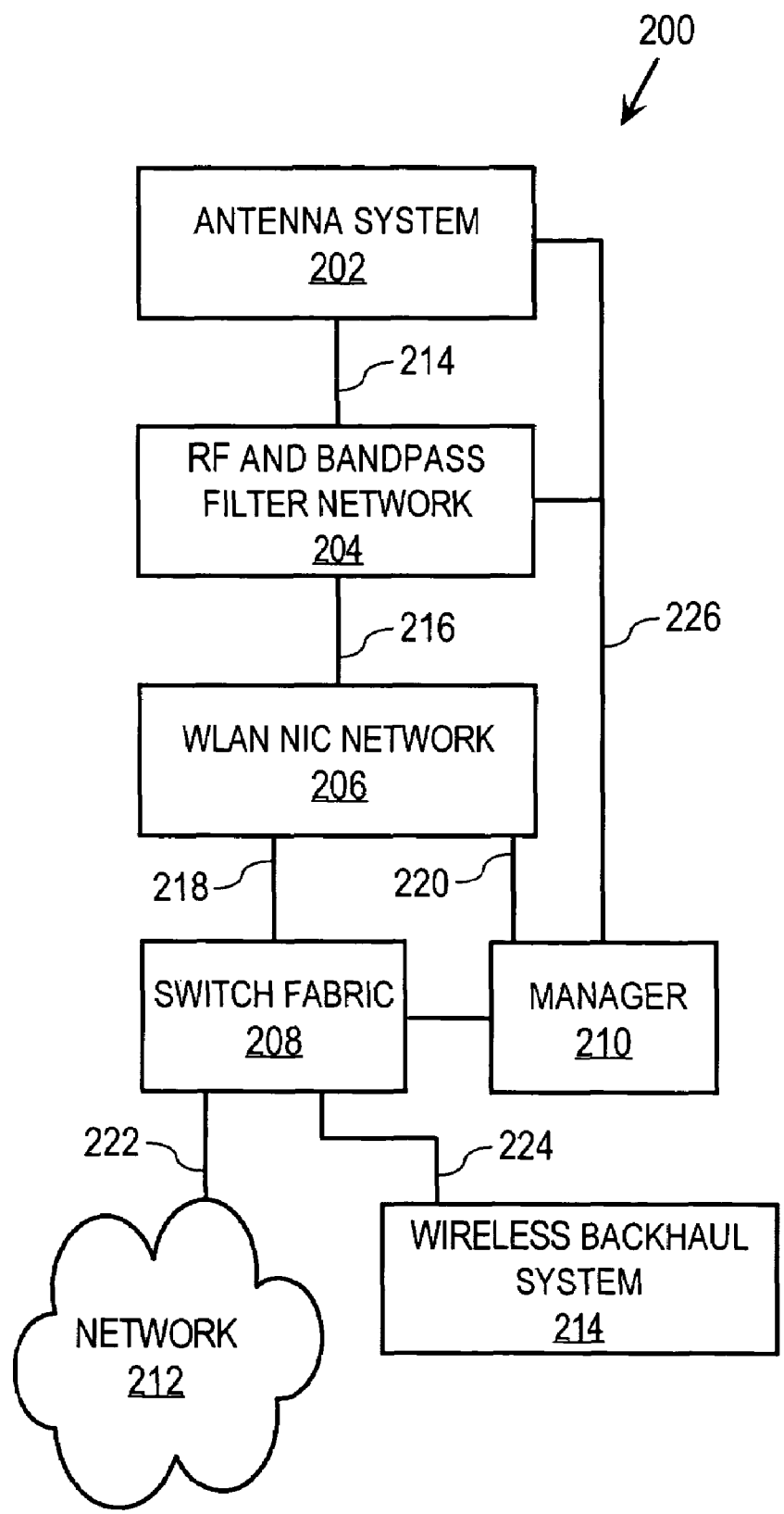
FIG. 2 is a block diagram that depicts a wireless communications apparatus configured in accordance with an embodiment of the invention.

FIG. 2 is a block diagram that depicts a wireless communications apparatus 200 configured in accordance with an embodiment of the invention. Apparatus 200 includes an antenna system 202, a Radio Frequency (RF) and bandpass filter network 204, a Wireless Local Area Network (WLAN) Network Interface Card (NIC) network 206 or silicon that performs the function of the multiplicity of WLAN transceivers, a switch fabric 208 and a manager 210.

According to one embodiment of the invention, the antenna system transmits and receives electromagnetic radiation in a particular spatial direction. The antenna system has the property that the radiation it transmits and receives other than from the desired spatial location is minimized.

According to one embodiment of the invention, the antenna system has multiple transmit and receive antennas in any sector. The wireless communication system has the property that it transmits and receives radiation from any one of the radiating elements. The communication system chooses which radiating element to transmit or receive in a particular sector to maximize performance. The capability to have multiple antennas in a sector provides diversity. There are many forms of diversity that can be implemented. For example, in one embodiment, an MRC diversity technique is employed where the output of the antennas are combined in an optimal manner. In another embodiment, a switch diversity technique is employed where the antenna with the strongest signal is output to the baseband receiver.

According to one embodiment of the invention, RF and bandpass filter network 204 is configured to perform two functions. First, RF and bandpass filter network 204 is configured to perform band separation and separate out one or more frequency bands from the RF signals provided by antenna system 202. For example, this may involve processing the RF signal from antenna system 202 to obtain 2.4 and 5 GHz signals. Second, RF and bandpass filter network 204 is configured to perform channelization within each frequency band to improve system performance. The output of RF and bandpass filter network 204 is provided to WLAN NIC network 206.

RF and bandpass filter network 204 may include a beamforming pointing network to dynamically change the angles of sectors 102-112. This function allows the size and/or location of sectors 102-112 to be dynamically changed.

According to one embodiment of the invention, RF and bandpass filter network 204 is configured to join multiple sectors 102-112. This includes allowing a signal to be transmitted to or received from multiple sectors 102-112 simultaneously. This may be useful, for example, for increasing range in low isolation antenna systems at the expense of throughput.

According to another embodiment of the invention, RF and bandpass filter network 204 may be omitted and protocol software may provide the appearance of joint multiple sectors 102-112. This includes allowing a signal to be transmitted to or received from multiple sectors 102-112 simultaneously.

WLAN NIC network 206 is configured generally to change RF signals from RF and bandpass filter network 204 into digital signals in the form of data packets. According to one embodiment of the invention, WLAN NIC network 206 is configured to amplify the RF energy before performing frequency translation of the signal to base band separating the signal into its in-phase and quadrature components. The respective components of the signal are sampled and demodulated into their constituent bits as specified by an applicable standard, for example, the IEEE 802.11 standard. The WLAN NIC network 206 may also be configured to provide de-scrambling, error correction and low-level protocol functions, for example, RTS/CTS generation and acknowledgment, fragmentation and de-fragmentation, and automatic beacon monitoring. The decoded bits are grouped into packets, for example as specified by the IEEE standard, and then provided to switch fabric 208 and manager 210.

Switch fabric 208 is coupled between WLAN NIC network 206 and a network 212, such as a Local Area Network (LAN), Wide Area Network (WAN) or the Internet, and/or to a wireless backhaul system 214. Wireless backhaul system 214 may include a WLAN backhaul NIC and a WLAN backhaul radiating element that are not depicted in FIG. 2 for simplicity.

Manager 210 is configured to perform a variety of management and control functions in apparatus 200. The particular functions performed by manager 210 may vary, depending upon the requirements of a particular application, and the invention is not limited to manager 210 performing any particular tasks. Example management and control functions include, without limitation, managing overall system and sector configuration, managing the frequency bands, communications channels and communications protocols for each sector, managing security protocols, managing the transmit power level and receive sensitivity for each sector, detecting and alerting network administrators the presence of non-authorized or interfering access points and managing communications between wireless devices and between wireless devices and network 212 and wireless backhaul system 214. Each of these management functions is described in more detail hereinafter.

According to one embodiment of the invention, manager 210 is configured to control switch fabric 208 to provide for the selective exchange of data between wireless devices in any particular sector 102-112 and also between wireless devices in different sectors 102-112. Manager 210 is also configured to perform switching functions to provide for the selective exchange of data between sectors 102-112 and network 212 and between sectors 102-112 and a wireless network connected to wireless backhaul system 214.

According to one embodiment of the invention, manager 210 is also configured to aggregate data from multiple wireless devices in one or more sectors, and cause the aggregated data to be transmitted onto network 212 or the wireless network connected to wireless backhaul system 214. For example, in FIG. 1A, manager 210 is configured to aggregate data from sectors 102-110 and transmit the aggregated data onto network 212 or to wireless network via wireless backhaul system 214. According to one embodiment of the invention, manager 210 transmits the aggregated data onto network 212 or to wireless network via wireless backhaul system 214 via one or more ports. As described in more detail hereinafter, manager 210 is also configured to manage the communications channels used to communicate with wireless devices and to manage the transmit power and receive sensitivities of each sector 102-112.

According to one embodiment of the invention, manager 210 is also configured to maintain configuration data that defines the configuration and operation of apparatus 100. The configuration data may be stored on a volatile storage, such as a RAM, or a non-volatile storage, such as one or more disks or in a database, depending upon the requirements of a particular application. The configuration data may specify, for example, the configuration of the overall system and each sector, information about each wireless device, such as identification and device type information as well as the sector location of each wireless device. The configuration data may also specify a current set of selected communications channels, the particular communications channels to be used in each sector and by each wireless device and the particular frequency bands and communications protocols to be used in each sector and/or by each wireless device. As another example, the configuration data may specify a transmit power level and receive sensitivity for each sector. Manager 210 is also configured to update the configuration information in response to various events.

According to one embodiment of the invention, manager 210 is configured to manage the movement of wireless devices between sectors. This may include, for example, re-assigning communications channels and time slots and updating other information relating to the wireless devices that moved. Suppose that a particular wireless device moves from sector 102 to sector 104. In this situation, manager 210 may assign a new communications channel to the particular wireless device, for example if the current communications channel of the particular wireless device is not being used in sector 104. Manager 210 then updates the configuration information to reflect that the particular wireless device is now located in sector 104 and that communications with the particular wireless device are now to be made using the new assigned communications channel.

Antenna system 202, RF and bandpass filter network 204, WLAN NIC network 206, switch fabric 208, manager 210, network 212 and wireless backhaul system 214 are communicatively coupled by links 216, 218, 220, 222 and 224, as depicted in FIG. 2. Links 216-224 may be implemented by any medium or mechanism that provides for the exchange of data between these elements. Examples of links 216-224 include, without limitation, a network such as a Local Area Network (LAN), Wide Area Network (WAN), Ethernet or the Internet, or one or more terrestrial, satellite or wireless links. A link 226 provides for the exchange of control signals between manager 210 and antenna system 202, RF and bandpass filter network 204, WLAN NIC Network 206 and switch fabric 208.

FIG. 3A is a block diagram that depicts a wireless communications architecture 300 configured in accordance with another embodiment of the invention. Architecture 300 includes antenna elements, examples of these elements may be dipoles, patch elements 302 or other antenna systems, 304 that are configured to transmit on two different frequency bands. Antenna element 302 is coupled to a bandpass filter (BPF) 306 that is coupled to a wireless chipset 308. Antenna element 304 is coupled to a BPF 310 that is coupled to a wireless chipset 312. BPFs 306, 310 are controllable by BPF control inputs from a control apparatus, such as management processor and switch fabric 208. Wireless chipsets 308, 312 convert RF signals into digital signals that are provided on digital data outputs. The digital signals may be provided in the form of data packets that are provided to and switched by management processor and switch fabric 208.

FIG. 3B is a block diagram that depicts a wireless communications architecture 350 configured in accordance with another embodiment of the invention. In architecture 350, a dual frequency or ultra wideband antenna element 352 is coupled to a power divider 354. Power divider 354 is coupled to a BPF 356 that is coupled to a wireless chipset 358. Power divider 354 is also coupled to a BPF 360 that is coupled to a wireless chipset 362. As in FIG. 3A, BPFs 356, 360 are controllable by BPF control inputs from a control apparatus, such as manager 210. Also, wireless chipsets 358, 362 convert RF signals into digital signals that are provided on digital data outputs. The digital signals may be provided in the form of data packets that are provided to and switched by manager 210.

Although depicted in FIGS. 3A and 3B as discrete components, BPFs 306, 310 and 356, 360 and wireless chipsets 308, 312 and 358, 362 may be integrated into a single component. Also, BPFs 306, 310, 356, 360 may not be used in some applications, at the expense of performance.

IV. Communications Channels, Protocols and Multiple Access Schemes

Any type of communications channel allocation scheme may be used with the wireless communications architecture described herein. The allocation of communications channels to sectors 102-112 may vary depending upon the requirements of a particular implementation and the invention is not limited to any particular channel allocation scheme. Manager 210 is configured to manage the communications channels used to communicate with wireless devices. This may include, for example, determining initial communications channels to be used by wireless devices which may be based on isolation, interference or any other factor affecting performance, assigning communications channels and timeslots to wireless devices and selecting communications protocols. This may also include periodically checking the performance of selected communications channels and dynamically changing the communications channels used by wireless devices. This may include selecting a set of communications channels to be used in each sector based upon communications channel performance.

As described in more detail hereinafter, apparatus 100 may be configured to support multiple frequency bands operating simultaneously. Different frequency bands may be used in different sectors, or even in the same sector. For example, apparatus 100 may be configured with antenna elements and associated electronics to support communications on both the 2.4 Ghz and 5 Ghz frequency bands. Apparatus 100 may also be configured to support any type and number of communications protocols. Example protocols supported by apparatus 100 include, without limitations, the IEEE 802.11(x) communications protocols, such as 802.11(a), (b), (g), the 802.15 (x), 802.16(x) and 802.20(x) communications protocols, and other future communications protocols.

Apparatus 100 may also be configured to support any type and number of multiple access schemes to support communications with multiple wireless devices. For example, a Carrier Sense Multiple Access (CSMA), carrier detect or energy detect scheme may be employed to allow multiple wireless devices to communicate using a specified set of communications channels. The wireless devices then communicate on the allocated set of channels using a multiple access scheme such as FDMA or TDMA.

V. Interference Mitigation and Power Control

Wireless communications apparatus 100 may be configured to reduce the amount of interference between wireless devices in different sectors 102-112. It is extremely difficult, if not impossible, however to completely eliminate all interference between sectors because of the presence of main and side lobes and near field coupling.

Figure 4A:
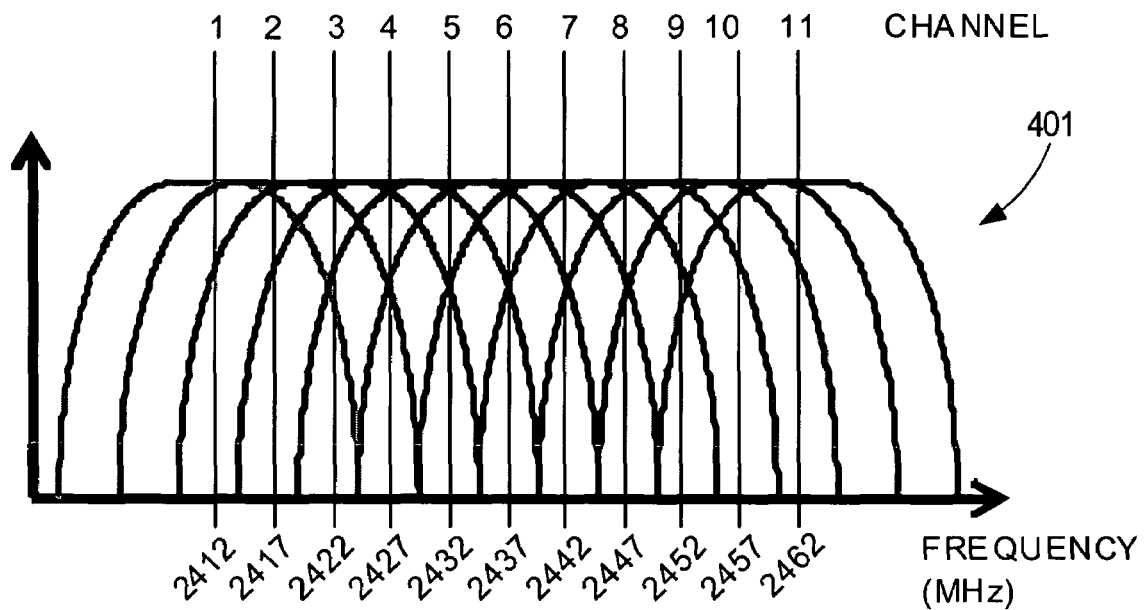
FIG. 4A is a functional diagram that depicts a plurality of frequency channels according to the 802.11b standard in an embodiment of the invention.
Figure 4B:
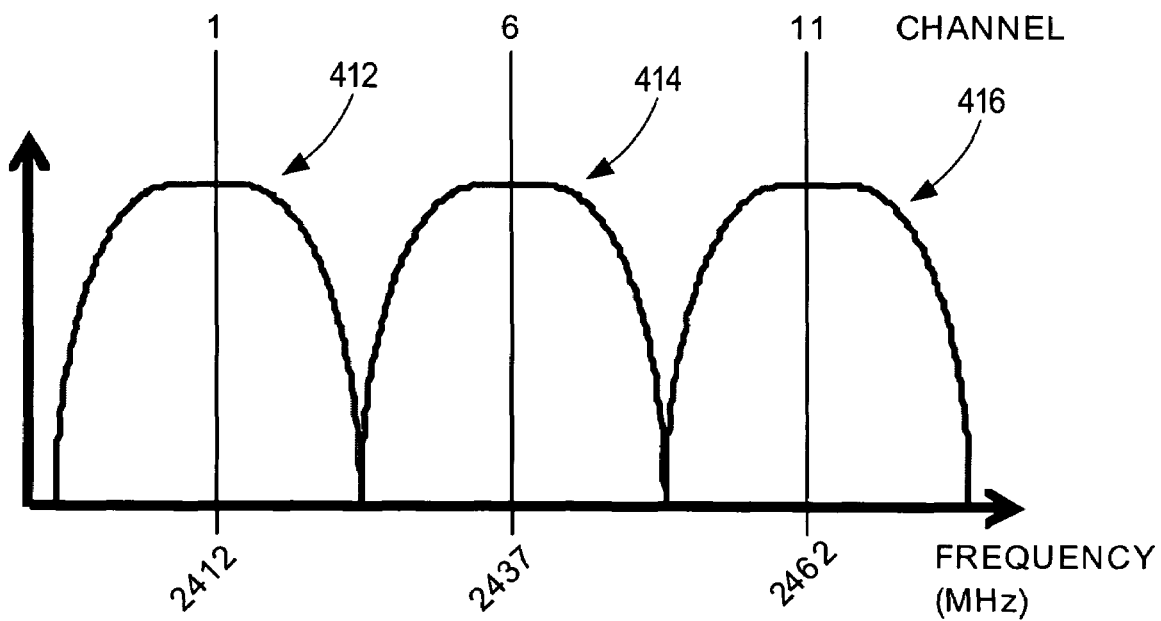
FIG. 4B is a functional diagram that depicts one set of three channels chosen from the channels illustrated by FIG. 4A.

FIG. 4A illustrates a plurality of frequency channels according to the 802.11b standard, which provides for 11 overlapping frequency channels 401 in a frequency spectrum allocated for wireless communications in the United States. FIG. 4B illustrates one set of three channels chosen from the 11 channels, i.e., channel 1 412, channel 6 414 and channel 11 416, that are non-overlapping for the 2.4-2.5 GHz ISM band. Communications on these channels will be non-interfering. The selection of non-overlapping channels from a frequency band is not limited to the example of the 802.11 frequency band illustrated by FIGS. 4A and 4B, rather, it is broadly applicable to other frequency bands having finite allocation of useful channels in some embodiments of the present invention. In Japan, for example, 14 frequencies are presently allocated to wireless LAN communications.

In a multi-sector wireless embodiment where the number of sectors is greater than the total number of non-overlapping channels, use of overlapping channels may be desirable or necessary and thus the potential for sector-to-sector frequency interference may increase. Antenna systems configured to provide multiple sector wireless communications typically exhibit spill-over from a desired sector into other sectors, which may frustrate attempts to provide absolute spatial division between wireless communications in different sectors. For situations were the sectors exceed number of non-overlapped channels, this spill-over, combined with channel overlap, may result in interference which can reduce the overall performance of a deployment, in terms of aggregate throughput and/or in-sector range.

Figure 5:
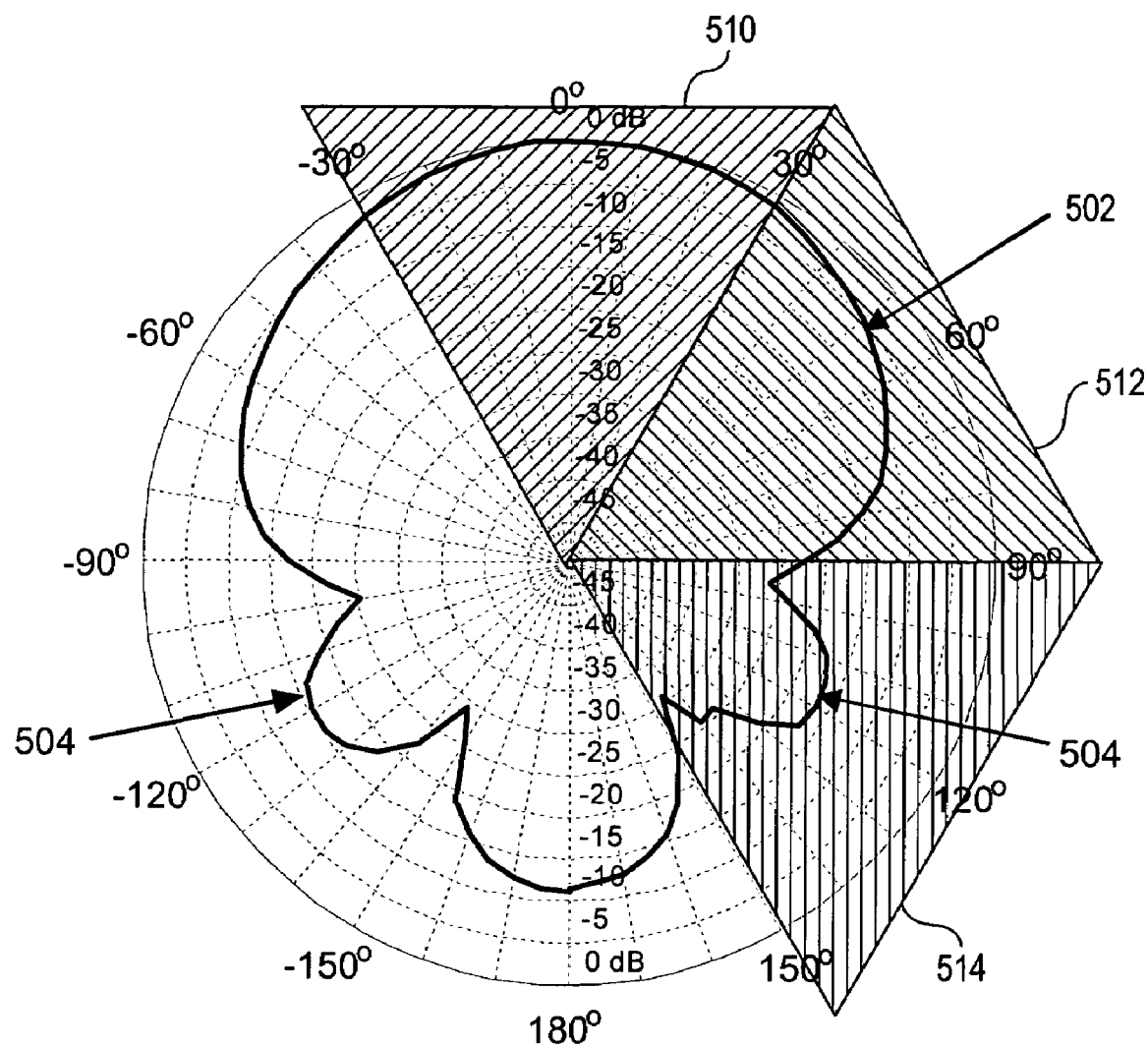
FIG. 5 is a functional diagram that depicts an example of an antenna radiation pattern in an embodiment of the invention.

FIG. 5 illustrates an example of an antenna radiation pattern in an embodiment of the present invention. The radiation pattern for a realizable directional antenna as depicted by FIG. 5 includes a mainlobe 502 and sidelobes 504. The main lobe may be defined by a half-power (−3 dB) point, in which case FIG. 5 represents a pattern with a 60° beam width. In FIG. 5, three 60° sectors are shown. A first sector 510 comprises a main sector. A second sector 512 experiences mainlobe spillover 502, while a third sector 514 experiences sidelobe spill-over 504.

In general, it is desirable to reduce the amount of interference between sectors 510, 512 and 514 to below a specified level in order to provide reliable performance and an acceptable level of quality of service. For example, according to one embodiment of the invention, various techniques are employed to reduce the magnitude of side lobes generated by each sector to reduce the likelihood that transmissions from one sector will trigger a carrier or energy detection algorithm of another sector. Reducing the amount of interference between sectors may also allow the same communications channels to be re-used, i.e., used simultaneously in more than one sector. This greatly increases the number of wireless devices that can be supported by apparatus 100 given a limited amount of available frequency spectrum.

In some embodiments, one or more of frequency division and polarization division may be used to reduce sector-to-sector interference. As shown by FIG. 5, adjacent sectors, i.e., sectors 510 and 512 for example, experience the least spatial division, and therefore require the most channel separation (frequency division) and/or polarization separation.

Apparatus 100 may be configured to avoid other access points in its vicinity as well as wireless devices in different sectors. Apparatus 100 may be configured to reduce interference between wireless devices in different sectors using techniques described herein with reference to example embodiments. For example, as described hereinafter in more detail, one or more antenna elements may be physically configured to reduce interference between wireless devices in different sectors. This may include selecting materials and physically constructing antenna elements in a manner to reduce interference between sectors. Also, the polarization of one or more antenna elements may be changed to reduce the amount of interference between wireless devices in different sectors. For example, the polarization orientation of adjacent sectors 102-112 may be varied to reduce interference between wireless devices operating in adjacent sectors 102-112. For example, an antenna element that provides communications with wireless devices in sector 102 may have a first polarization orientation. An antenna element that provides communications with wireless devices in sector 104 may have a second polarization orientation, that is oriented at some angle to the first. In one embodiment, this may be ninety degrees with respect to the antenna element for sector 102.

According to one embodiment of the invention, frequency channelization techniques may be employed to select communications channels to reduce interference between sectors and to provide a specified level of quality of service. For example, as described above with reference to FIGS. 4A and 4B, the IEEE 802.11(b) protocol specifies communications on eleven communications channels, of which three (channels 1, 6, 11) are non-overlapping. Thus, in one embodiment employing a three-sector configuration, manager 210 may specify that communication channels 1, 6 and 11 are to be used for the sectors 510, 512 and 514, respectively, to reduce the amount of interference and provide more favorable quality of service.

In one embodiment, a method of allocating channels to transmitters and/or sectors to minimize interference is provided. While the method will be described with reference to an example in which channels are assigned to sectors, the method is also applicable in embodiments in which channels are assigned to transmitters.

Let $\Psi = \{C_1, \ldots, C_m\}$ denote the set of m available channels in the band of interest. Let $S_j$ denote the jth subset of $\Psi$, i.e. $S_j \subset \Psi$. For example, in an embodiment employing 802.11b, under a present FCC regulatory domain there are eleven channels, numbered from 1 to 11, ranging from 2.401 GHz to 2.467 GHz. Further, let $S^i_j$ denote the ith element of the set $S_j$ and on the set $S_j$ we define the operation of subtraction between any two elements of this set. For any set $S_j$ the power of the set may be defined as:

$$P(S_j) = \min_{\substack{i=1\ldots n \\ k=1\ldots n \\ i \neq k}} |S^i_j - S^k_j|. \quad (1)$$

The power of the set determines the channel separation between the two closest channels that belong to a set.

Let $\overline{S}_{k,i}$ define a transmitter or sector assignment i for the channel set $S_k$. The quantity $\overline{S}_{k,i}$ corresponds to an ordered set of the elements of the set $S_k$ where the first element of the array corresponds to sector 1 (or transmitter 1) and the nth element corresponds to the nth sector (or transmitter). The tilde is used to distinguish between the two sets where the set $\overline{S}_{k,i}$ is the ith ordered set meaning that the relation of the channels in the set corresponds to their respective sector (or transmitter) assignments.

If the set $S_k$ is comprised of three elements $S_k = \{C_1, C_2, C_3\}$, for example, then the possible ordered channel sets are:

$$\overline{S}_{k,1} = \{C_1 C_2 C_3\} \quad (2)$$

$$\overline{S}_{k,2} = \{C_1 C_3 C_2\}$$

$$\overline{S}_{k,3} = \{C_2 C_1 C_3\}$$

$$\overline{S}_{k,4} = \{C_2 C_3 C_1\}$$

$$\overline{S}_{k,5} = \{C_3 C_1 C_2\}$$

$$\overline{S}_{k,6} = \{C_3 C_2 C_1\}$$

In these ordered channel sets, differences in the sequence of channels correspond to different channel to sector (or transmitter) assignments. In the illustrated example embodiment, the ordered channel sets $\overline{S}_{k,1}$ and $\overline{S}_{k,2}$ are distinct sets because the channels in each set are have a different ordering even though the two sets have exactly the same channels.

The separation distance of the set $\overline{S}_{k,i}$ for circular antenna system may be defined as:

$$S(\overline{S}_{k,i}) = \min_{r=1\ldots n} |\overline{S}^r_{k,i} - \overline{S}^{r+1 \bmod n}_{k,i}| \quad (3)$$

For a linear system, the separation distance may be defined as:

$$S(\overline{S}_{k,i}) = \min_{r=1,\ldots,n} |\overline{S}^r_{k,i} - \overline{S}^{r+1}_{k,i}| \quad (4)$$

The measures in equations (3) and (4) determine the separation between adjacent sectors (or transmitters). This may be performed when determining how close the assigned channels are to channels assigned to adjacent sectors (or transmitters). In some embodiments, this determination can enable reduced interference.

In one embodiment, an interference function may be defined as:

$$g(\theta, \overline{S}_{k,i}) = \sum_{r=1}^{n} \sum_{t=r}^{n} w^{rt}(\theta, \overline{S}^r_{k,i}, \overline{S}^t_{k,i}) \quad (5)$$

Where the interference generated as a function of angular position and channel selection is given by:

$$w^{rt}(\theta, \overline{S}^r_{k,i}, \overline{S}^t_{k,i}) \geq 0 \quad (6)$$

$$\forall \, 0 \leq \theta < 2\pi, \{\overline{S}^r_{k,i}, \overline{S}^t_{k,i}\} \in \Psi$$

Equation 6 represents a cost that is arbitrary and encompasses the class of all interference generating functions.

An example of the interference generating function, in one embodiment, is defined as:

$$w^{rt}(\theta, \overline{S}^r_{k,i}, \overline{S}^t_{k,i}) = \int_{f^L_r}^{f^U_r} A(\theta - \theta_r, f) r(\overline{S}^r_{k,i}, \overline{S}^t_{k,i}, f) n(\overline{S}^r_{k,i}, \overline{S}^t_{k,i}, f) df \, 0 \leq \quad (7)$$

$$\theta^L_r \leq \theta \leq \theta^U_r < 2\pi$$

Where $f_r^L$, and $f_r^U$ are the lower and upper frequencies of channel r. The quantities $\theta_r^L$ and $\theta_r^U$ are the lower and upper angular frequencies of r. The quantity $A(\theta, f)$ is the antenna radiation pattern as a function of angular position and frequency and the quantities $r(\overline{S}^r_{k,i}, \overline{S}^t_{k,i}, f)$ and $n(\overline{S}^r_{k,i}, \overline{S}^t_{k,i}, f)$ represent the channel overlap as a function of channel number and frequency and the antenna near field and reflection interference generated.

Some examples of interference cost functions that can be used to minimize the interference in some embodiments are:

$$M = \min_{0 \leq \theta < 2\pi} g(\theta, \overline{S}_{k,i}) \quad (8)$$

$$M = \int_0^{2\pi} g(\theta, \overline{S}_{k,i}) \quad (9)$$

Figure 6A:
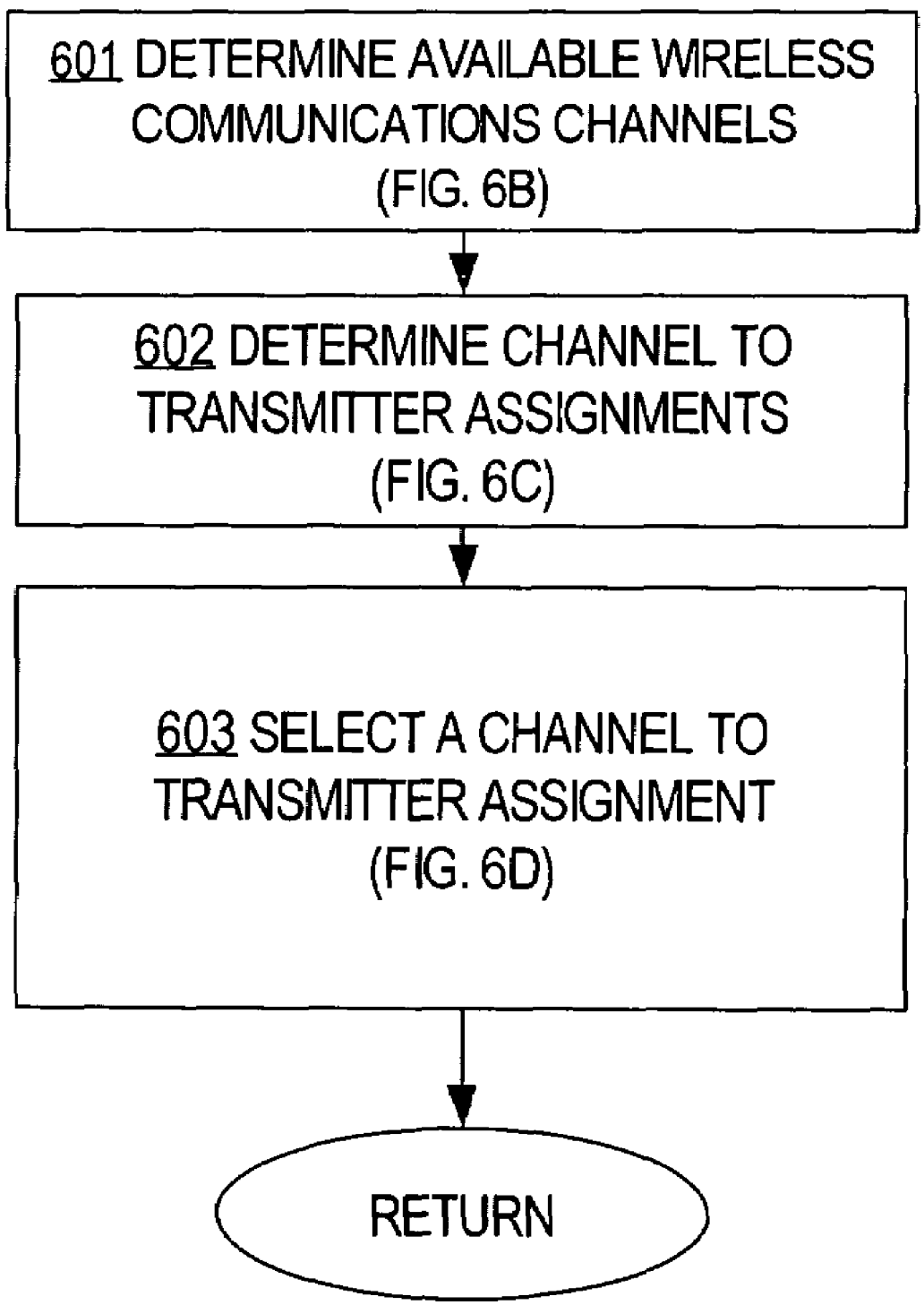
FIGS. 6A-6D are flowcharts depicting channel allocation processing in accordance with an embodiment of the invention.

FIG. 6A is a flowchart depicting an example of allocating channels in accordance with an embodiment of the invention. In block 601, available wireless communications channels are determined for a band of wireless communications frequencies of interest, as depicted in further detail in FIG. 6B. For example, if the band of interest is the IEEE 802.11 frequency band illustrated in FIG. 4A, then channels 1-11 are available channels. In other embodiments, many other frequency bands of interest may be selected. In block 602, channel to transmitter assignments are determined, as depicted in further detail in FIG. 6C. In some embodiments, channel to transmitter assignments may comprise assigning channels to individual radio transmitters. In alternative embodiments, channel to transmitter assignments may comprise an assignment of channels to sectors serviced by a sectorized antenna. In one embodiment, channel to transmitter assignment may be performed according to an overlap criteria that may specify, for example, a minimum separation for channels assigned to adjacent transmitters or sectors. For example, in one embodiment, a minimum of two channels can be required to separate a first channel and a second channel assigned to adjacent transmitters. In another embodiment, a criteria such as each sector must be at least n channels away from the other sectors may be used. The channel separation, r, may be chosen as a function of the number of utilized transmitters or sectors. The channel separation, r, is application specific and may depend on the available transmitters or sectors which are to be used. In block 603, a channel to transmitter assignment is selected, as depicted in further detail in FIG. 6D.

In one embodiment, a channel to transmitter assignment that minimizes overall interference is selected from among candidate channel to transmitter assignments. In other embodiments, a channel to transmitter assignment that provides any one or a combination of criteria, such as for example without limitation: a) maximal power, b) greatest range, c) increased throughput of the device, d) increased network throughput, e) minimal disruption to network already in place, f) avoidance of other provisioned services, g) minimal packet error rate (PER) or bit error rate (BER), h) minimal channel utilization, i) minimal channel blocking probabilities, j) greater number of stations to connect at the highest rates, k) adequate quality of service for station requiring high throughput and/or low latency and/or low jitter, l) avoidance of radars or other radiolocation devices, m) cognitive radio function based upon a sense of the channels used to determine that other services or users are not present, may be chosen. In one embodiment, the transmitter may monitor the set up to ensure any of the above criteria are satisfied.

Figure 6B:
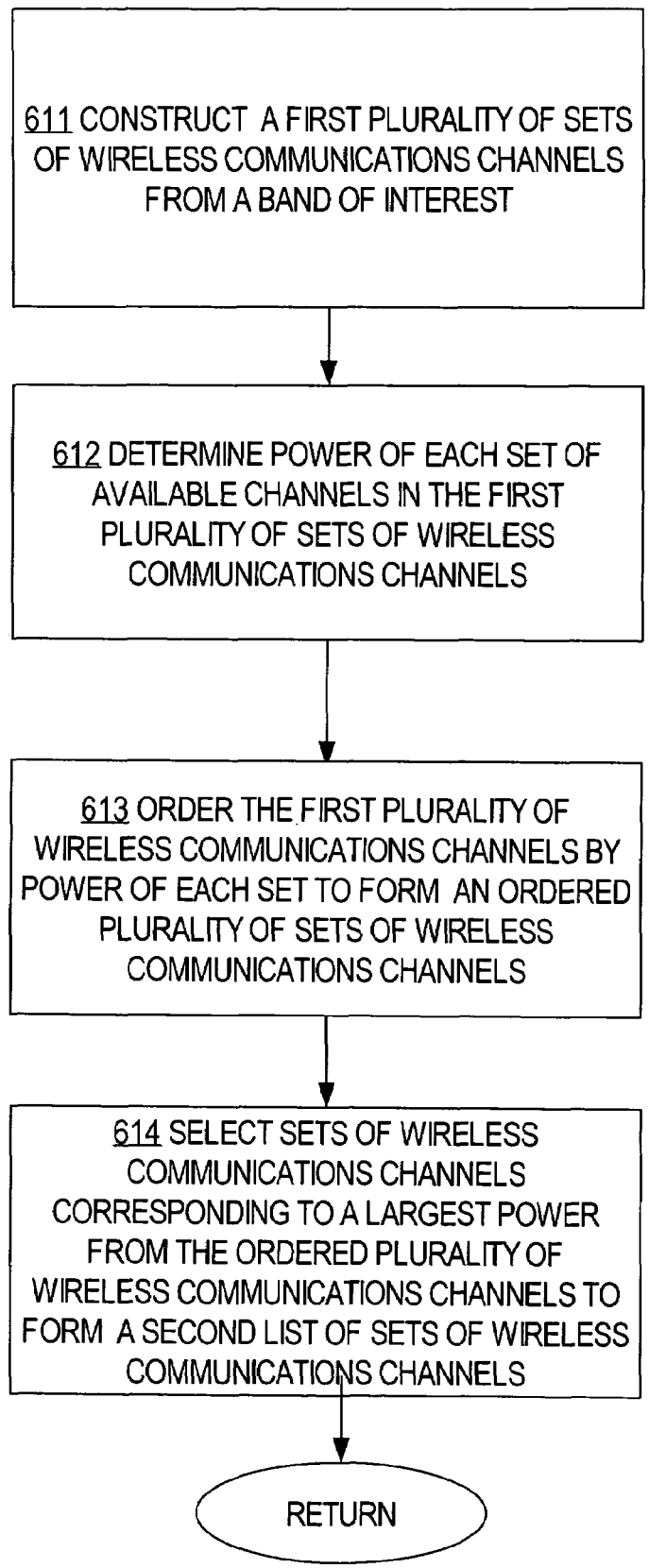

FIG. 6B is a flowchart depicting an example of determining the available set of channels in accordance with an embodiment of the invention. In one embodiment, sets of available channels which correspond to the largest frequency separation are determined based on the information that there are m channels and n of these are to be used in the sectorization scheme.

In block 611, from the set of m available channels $\{C_1, \ldots, C_m\}$ a list $L=\{S_1, \ldots, S_k\}$, of sets of channels is constructed. The list $\hat{L}$ can contain exactly n elements where m≧n. Since there are a possible m channels, there are exactly $$\binom{m}{n} = \frac{m!}{(m-n)!n!}$$

sets in the list in one example embodiment. In block 612, for all sets in the list $\hat{L}$, the power of each set is determined in accordance with equation (1). In block 613, list L is ordered based on the power of each set. In block 614, the sets having the largest power are chosen and a new list denoted by $\hat{L}$ is constructed. In various embodiments, sets may be chosen using one or more criteria, such as for example without limitation: a) selecting a fixed number of sets which can be evaluated (tried and measurements made) in the available set up time, b) determining the score for every set, wherein each set is evaluated (tried), c) determining the score for every set and trying the first m with the highest probability of success, d) determining the score of all sets and choosing the highest.

The list $\hat{L}$ corresponds to the list of candidate channel sets that will be tested to determine whether each of the candidate channel sets meets a minimum separation criteria, for example. The list $\hat{L}$ corresponds to the channel sets that have the greatest channel separation. In one embodiment, this process provides candidate channels sets that are separated as far as possible in frequency to reduce side effects such as near field coupling.

Figure 6C:
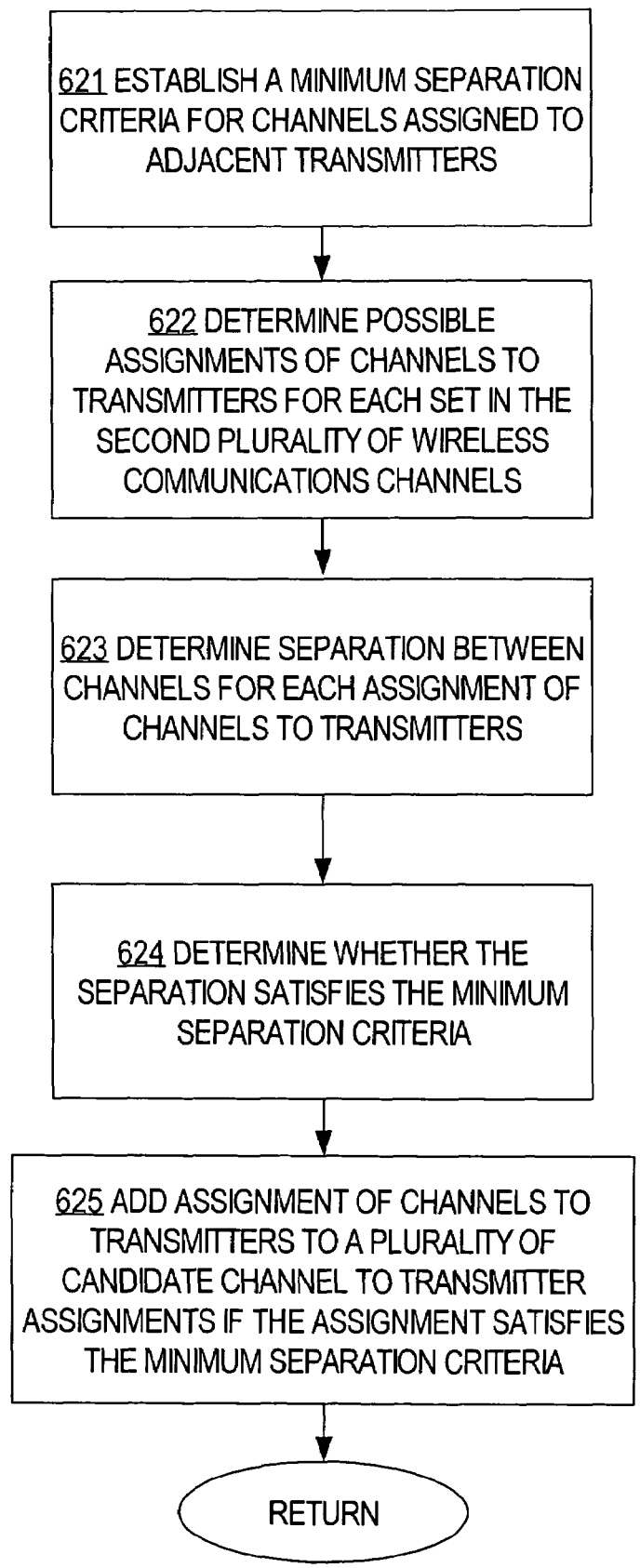

FIG. 6C is a flowchart depicting an example of determining the channel assignments in accordance with one embodiment of the invention. In block 621, minimum separation criteria for channels assigned to adjacent transmitters or sectors is established. For example, in one embodiment, channels assigned to adjacent transmitters may be subjected to a minimum separation criterion that specifies no channel overlap. In another example embodiment, sectors serviced by a sectorized antenna may be subject to a criterion that specifies that at least two channels separate the channels assigned to the adjacent sectors. In other embodiments, various other minimum separation criteria may be used. In block 622, for each candidate channel set in list $\hat{L}$, possible channel to transmitter assignments are determined. For example, for each set $S_k$ all n!possible permutations of the candidate channel set are determined, where a permutation is denoted by $\overline{S}_{k,i}$. In block 623, for each permutation the separation of the set is determined. For example, $S(\overline{S}_{k,i})$ is computed, and a determination is made whether the result satisfies the minimum separation criteria as specified in block 621. If a channel set satisfies the minimum separation criteria then the set is a candidate for utilization. Otherwise, the permutation is discarded and the next permutation is determined. In some embodiments, the foregoing process steps are completed for all possible assignments of channel sets to transmitters or sectors.

Figure 6D:
Figure 6D:

FIG. 6D is a flowchart depicting an example of selecting a channel assignment in accordance with an embodiment of the invention. In block 631, an overall interference generated by each channel to transmitter assignment is determined. In block 632, a candidate channel set that minimizes the overall interference is chosen.

The foregoing processing will next be illustrated with reference to an example in the context of a six-sector 802.11b system with eleven available channels numbered 1 to 11. The overlap criteria for channel selection to reduce interference in a 6-sector implementation are: (1) no sector is closer than 2 channels from any other sector; and (2) adjacent sectors are at least 4 channels apart, in other words, separation is greater than or equal to 4. Accordingly, the power of the set is equal to 2. (Power of a set is a mathematical concept that refers to how close two elements of a set are. For example consider the set {3,1,9,25,101}. The power of this set is 2 because the first element, number 3, and the second element, number 1, are two units away.)

Criterion (1) leads to the un-ordered 6-channel set {1, 3, 5, 7, 9, 11}, while criterion 2 leads to the five, 6-channel sector-ordered sets as shown in Table 1.

TABLE 1

802.11b 6-Channel Sets for Reduced Interference

{1, 5, 9, 3, 7, 11}
{1, 5, 9, 3, 11, 7}
{1, 5, 11, 7, 3, 9}

TABLE 1-continued 802.11b 6-Channel Sets for Reduced Interference

{1, 7, 3, 9, 5, 11}
{1, 7, 3, 11, 5, 9}

Figure 7:
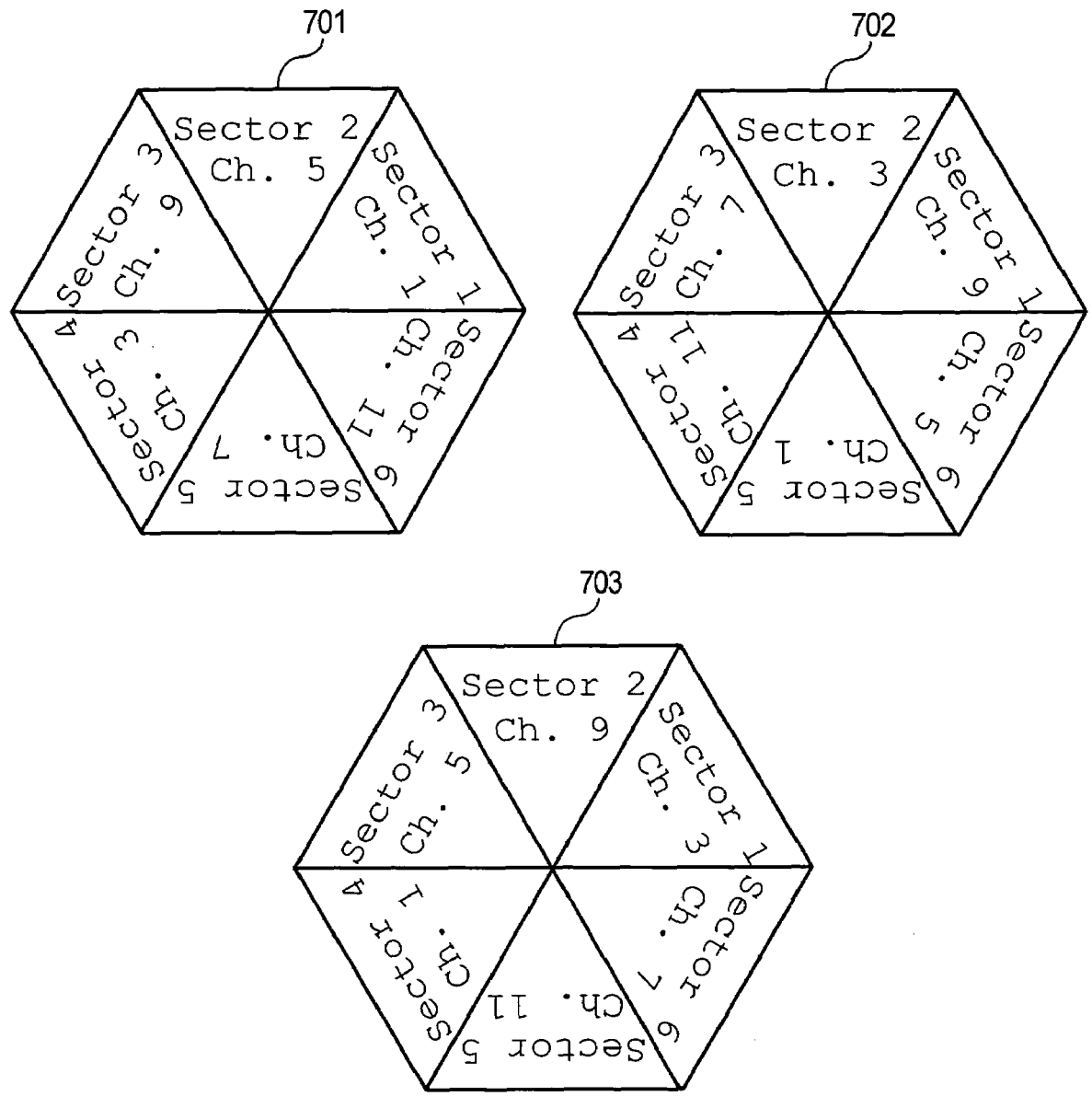
FIG. 7 is a functional diagram that depicts variations of an example sector-ordered 6-channel set in accordance with an embodiment of the invention.

A cyclic rotation of a channel set and/or reverse indexing (with respect to sector number) also may meet the criteria. For example, FIG. 7 illustrates variations of an example sector-ordered 6-channel set in accordance with an embodiment of the invention. FIG. 7 shows the first channel set 701 from Table 1, along with a rotation 702, and a reversal and rotation 703 of the same channel set in accordance with one embodiment.

Figure 8:
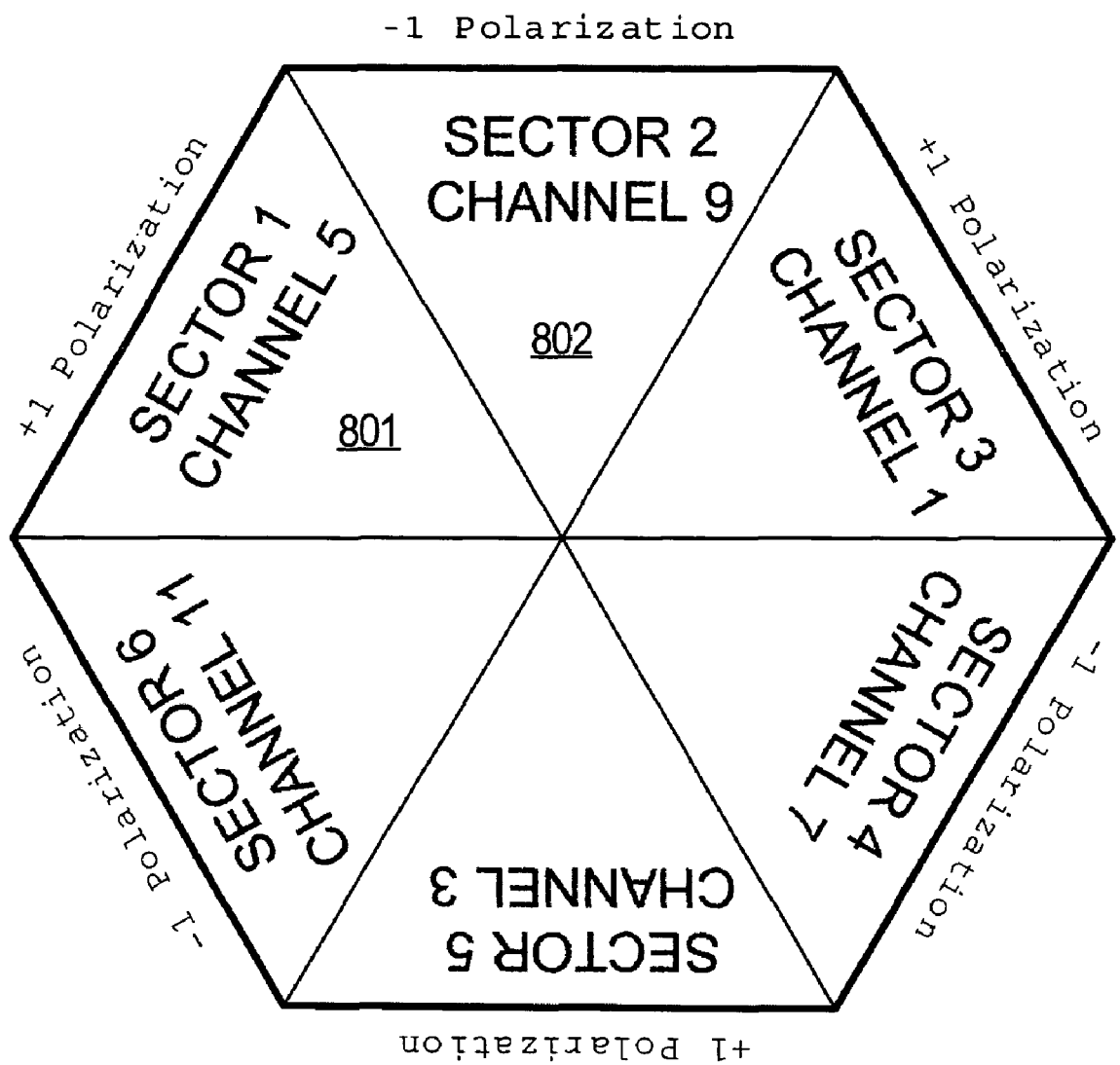
FIG. 8 is a functional diagram that depicts polarization assignment in an embodiment of the invention.

Some embodiments may employ cross-polarization techniques to reduce sector-to-sector interference. In FIG. 8, an example polarization assignment is shown in one embodiment. In the following description, +1 and −1 denote two different polarizations. In the case of linear polarization, +1 (−1) may denote vertical polarization, in which case −1 (+1) would denote horizontal polarization. For circular polarization, +1 (−1) may denote right-circular polarization and −1 (+1) would denote left-circular polarization in some embodiments. As depicted in FIG. 8, one cross-polarization technique comprises providing adjacent sectors with different polarizations to reduce interference between adjacent sectors. For example, in FIG. 8, sector 1 (801) is configured to operate on channel 5 with a +1 polarization. Adjacent sector 2 (802) is configured to operate on channel 9 with a (−1) polarization. A cyclic rotation of this polarization assignment (with respect to sector) would achieve the interference reduction in one embodiment. Techniques for controlling cross-polarization in one embodiment are described below with reference to FIG. 11A.

Figure 9:
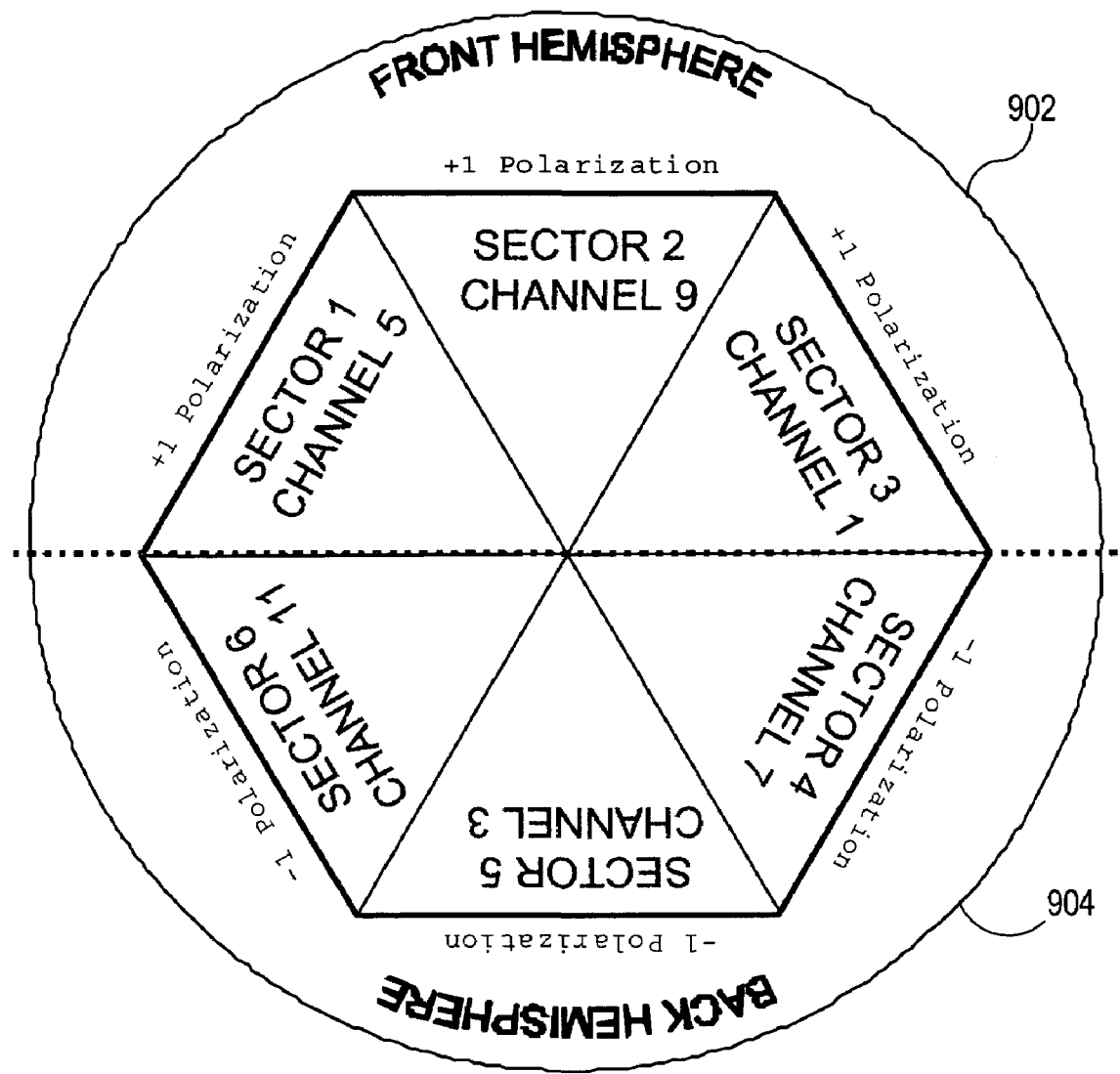
FIG. 9 is a functional diagram that depicts another example cross-polarization assignment in accordance with an embodiment of the invention.

FIG. 9 illustrates another cross polarization assignment in accordance with an embodiment of the invention. As depicted in FIG. 9, two 3-sector hemispheres, a "front" hemisphere 902 and a "back" hemisphere 904 have channel assignments such that no sectors within a hemisphere are closer than four channels. In the illustrated embodiment, however, cross-hemisphere sectors can be as close as two channels. For example, as depicted by FIG. 9, sector three in front hemisphere 902 is using channel one and sector five in back hemisphere 904 is using channel three. Sector three and sector five are separated by only one sector, sector 4, and channel one and channel three are within two channels of one another. Because sector three, in front hemisphere 902 is polarized with +1 polarization, while sector five, in back hemisphere 904, is polarized with +1 polarization, however, sector three and sector five can use channel one and channel three without substantial interference. In the embodiment illustrated by FIG. 9, the polarization assignment is such that all sectors in the front hemisphere 902 are cross-polarized with respect to the back hemisphere 904, however, sectors within a hemisphere have congruent polarization.

In situations where a communications protocol is employed that does not include non-overlapping channels, a testing scheme may be used to identify an assignment of communications channels to achieve specified interference and quality of service levels. This may include an initial test to identify a set of initial communications channels to be assigned to the sectors, as well as subsequent periodic testing to provide an updated set of communications channels.

Figure 1G:
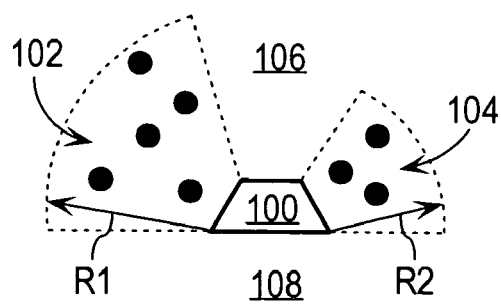

According to one embodiment of the invention, transmit power levels and receive sensitivities are selected to improve communications and reduce interference between sectors. Transmit power levels and receive sensitivities may be selected on a per transmitter, a per sector, per wireless device, or even per packet basis, depending upon the requirements of a particular implementation. Varying the transmit power level generally changes the size of a transmission area. For example, in FIG. 1G, the transmit power levels of apparatus 100 are selected to cause sector 102 to have a radius of R1 and sector 104 to have a radius of R2. In this example, the wireless devices in sector 104 are located relatively closer to apparatus 100 than the wireless devices in sector 102. Thus, less power needs to be used with the antenna element associated with sector 104, relative to the antenna element associated with sector 102.

Selectively adjusting the transmit power for each sector serviced by apparatus 100 reduces the overall power consumed by apparatus 100, reduces the possible interference between sectors 102 and 104, and improves security. Varying the receive sensitivity for a particular sector changes the general sensitivity to the particular sector to transmissions from other sectors and other types of interference. According to one embodiment of the invention, the receive sensitivity for a sector is optimized to provide a specified quality of service for wireless devices in the sector, while reducing the likelihood of interference. The transmit power level and receive sensitivities may be adjusted together to optimize sector performance.

Transmit power levels and receive sensitivities may be dynamically adjusted over time to compensate for changing conditions. This may include, for example, changes in the configuration of apparatus 100, changes in the locations and numbers of wireless devices, changes in the frequency band or channels being used, changing power or quality of service requirements and changes in interference sources.

VI. Antenna Configrrations

Figure 10A:
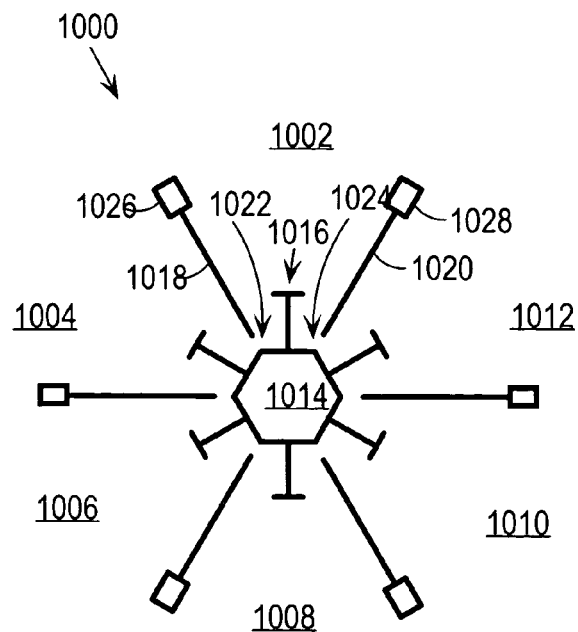
FIG. 10A is a block diagram that depicts a top view of an antenna apparatus configured in accordance with an embodiment of the invention.

Various antenna configurations may be employed with the wireless communications architecture described herein, depending upon the requirements of a particular application. FIG. 10A is a block diagram that depicts a top view of an antenna apparatus 1000 used with antenna system 202. Antenna apparatus 1000 includes various antenna elements configured to provide wireless communications with wireless devices located in sectors 1002-1012. Specifically, antenna apparatus 1000 includes a center reflector portion 1014. With respect to sector 1002, antenna apparatus 1000 includes a radiating assembly 1016 configured to radiate electromagnetic energy into sector 1002. Antenna apparatus 1000 also includes metal septums 1018, 1020 that are configured to define sector 1002. Metal septums 1018, 1020 may be separated from center reflector portion 1014, as indicated by apertures 1022, 1024, to reduce coupling between sector 1002 and the other sectors 1004-1012. According to one embodiment of the invention, septums 1018, 1020 are positioned from center reflector portion 1014 at a distance that is proportional to the transmission wavelength. Antenna apparatus 1000 also includes RF chokes 1026, 1028, coupled to the ends of metal septums 1018, 1020.

Figure 10B:
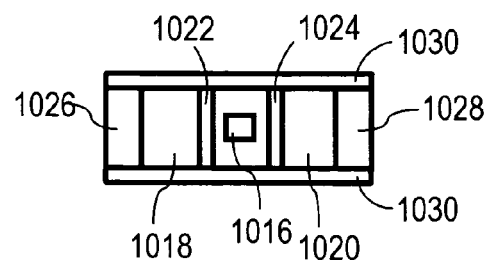
FIG. 10B is a side view of the antenna apparatus of FIG. 10A.

Antenna apparatus 1000 may also include radio frequency absorptive material, such as foam or other material or photonic bandgap structures, disposed between the metal septums and the top and bottom of antenna apparatus 1000 to further reduce coupling between sectors. For example, FIG. 10B is a side view of antenna apparatus 1000 depicting the various components of FIG. 10A. As depicted in FIG. 10B, radio frequency absorptive material 1030 is disposed on top and bottom of septums 1018, 1020 to reduce electromagnetic coupling between sectors 1002-1012.

Although antenna apparatus 1000 has been described in the context of sector 1002, antenna apparatus 1000 includes similar antenna elements for the other sectors 1004-1012. The dimensions and characteristics of the other antenna elements that provide wireless communications for sectors 1004-1012 may be the same as or different from the aforementioned antenna elements that provide wireless communications for sector 1002.

Figure 11A:
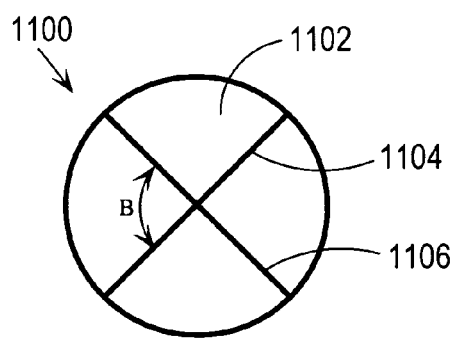
FIG. 11A is a block diagram of an end view of a radiating assembly configured in accordance with an embodiment of the invention.

FIG. 11A is a block diagram of an end view of a radiating assembly 1100 configured in accordance with an embodiment of the invention. Radiating assembly 1100 may be used for radiating assembly 1016 in antenna apparatus 1000. Radiating assembly 1100 includes a base 1102 and patch elements 1104, 1106 attached thereto. Patch elements 1104, 1106 may be built upon a PCB such as FR4, or other dielectric substrate. Although radiating assembly 1100 is configured with two patch elements 1104, 1106, radiating assembly 1100 may be configured with a single patch element, depending upon the requirements of a particular implementation. Patch elements 1104, 1106 are oriented with respect to each other at an angle B, as depicted in FIG. 11A, to introduce polarization diversity. According to one embodiment of the invention, patch elements 1104, 1106 are oriented at approximately ninety degrees with respect to each other, although other angles may be used, depending upon the requirements of a particular application. Radiating assembly 1100 may also be oriented with respect to other radiating assemblies in an antenna apparatus to decrease polarization alignment and provide greater isolation between sectors. For example, radiating assembly 1016 for sector 1002 may be oriented with respect to the radiating assemblies for sectors 1004-1012 to decrease polarization alignment and provide greater isolation between sectors 1002 and 1004-1012.

Figure 11B:
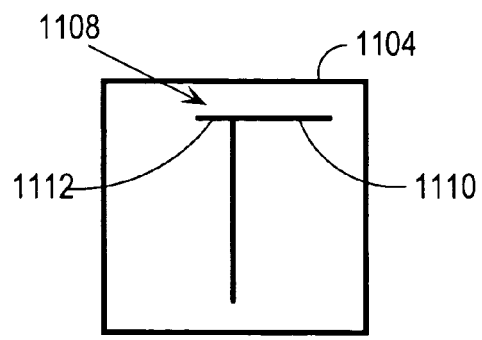
FIG. 11B is a block diagram that depicts a patch element configured according to an embodiment of the invention.

FIG. 11B is a block diagram that depicts patch element 1104 configured according to one embodiment of the invention. In this embodiment, patch element 1104 is duel frequency and includes a radiating element 1108. Radiating element 1108 is generally "T" shaped and includes a long microstrip 1110 for low frequency operation and a short microstrip 1112 for high frequency operation. Two microstrips 1110, 1112 are not required by the invention, and some implementations may have only a single microstrip where communications in only single frequency band are required. As an alternative to using the "T" shaped radiating element 1108 in dual-band applications, two separate patch elements may be used, where one of the patch elements is a small patch element that includes a high frequency microstrip and the other larger patch element includes a low frequency microstrip. In this situation, the smaller high frequency patch element may be suspended above the larger lower frequency patch element.

VII. Implementation Mechanisms, Alternatives & Extensions

The wireless communications architecture described herein may be implemented in hardware, software, or any combination of hardware and software. For example, manager 210 may be implemented using a generic computing platform that executes various software programs to perform the functions described herein.

Figure 12:
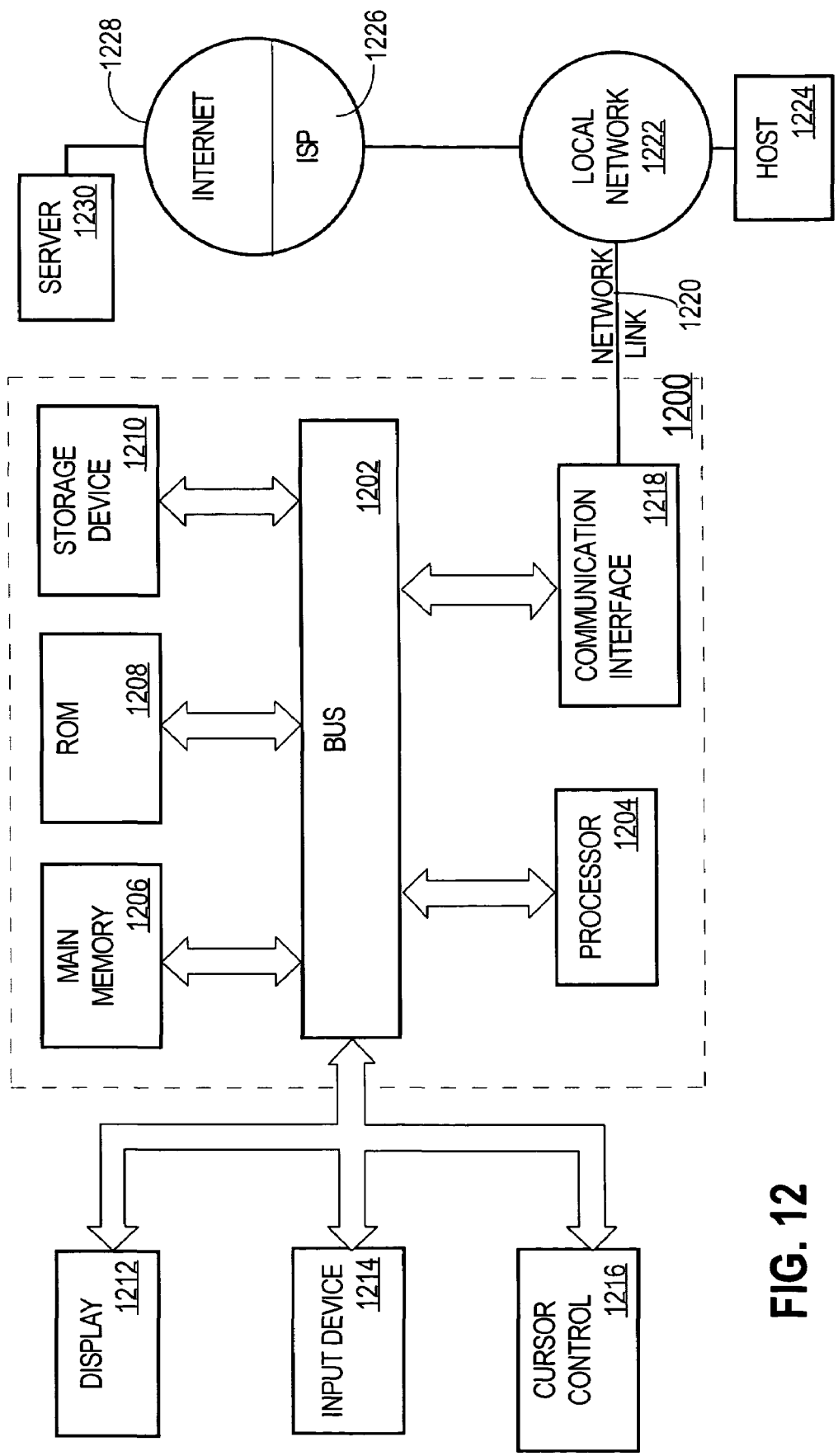
FIG. 12 is a block diagram that depicts a computer system on which embodiments of the invention may be implemented.

FIG. 12 is a block diagram that illustrates an example computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The term "computer-readable medium" as used herein refers to any medium that participates in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly refeffed to as the "Internet" 1228. Local network 1222 and Internet 1228 both use electrical, electromagnetic or optical signals that carry digital data streams. The signals are sent through the various networks and the signals on network link 1220 and through communication interface 1218, which carry the digital data to and from computer system 1200.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application manages a wireless communications architecture as described herein.

Processor 1204 may execute the code as it is received, and/or stored in storage device 1210, or other non-volatile storage for later execution. In this manner, computer system 1200 may obtain application code.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining an assignment of wireless communications channels to a plurality of wireless communications transmitters, comprising:

identifying a plurality of available wireless communications channels;

determining a plurality of wireless communications channel assignments based upon the plurality of available wireless communications channels and the plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;

determining a channel separation for each wireless communications channel assignment of the plurality of wireless communications channel assignments; and based on the channel separation that is determined for said each wireless communications channel assignment of the plurality of wireless communications channel assignments, selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria;

wherein the overall interference for each wireless communications channel assignment considers the interference for each wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:

determining $$S(\overline{S}_{k,i}) = \min_{r=1\ldots n} |\overline{S}_{k,i}^r - \overline{S}_{k,i}^{r+1 mod n}|,$$

wherein:

$S_k$ is a channel set that includes the plurality of wireless communications channels;

$\overline{S}_{k,i}$ defines a wireless communications channel assignment i for the channel set $S_k$ by specifying which wireless communications channels of the plurality of wireless communications channels are assigned to each wireless communications transmitter of the plurality of wireless communications transmitters for the wireless communications channel assignment i for the channel set $S_k$;

$1 < i \leq I$, in which I is a first number of wireless communications channel assignments in the plurality of wireless communications channel assignments;

n is a second number of wireless communications transmitters in the plurality of wireless communications transmitters; and $S(\overline{S}_{k,i})$ is a channel separation distance for the wireless communications channel assignment i defined by $\overline{S}_{k,i}$.

2. The method as recited in claim 1, wherein:

the method further comprises determining a power for each wireless communications channel assignment in the plurality of wireless communications channel assignments; and the selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:

selecting from the plurality of wireless communications channel assignments, a particular wireless communications channel assignment that provides less overall interference relative to other wireless communications channel assignments in the plurality of wireless communications channel assignments and satisfies a power criteria.

3. The method as recited in claim 2, wherein determining the power for each of the wireless communications channel assignments, further comprises:

determining $$P(S_j) = \min_{\substack{i=1\ldots n \\ k=1\ldots n \\ i \neq k}} |S_j^i - S_j^k|;$$

wherein $S_j^i$ denotes an ith element of a set $S_j$, which is a jth subset of $\Psi$, wherein $\Psi=\{C_1, \ldots, C_m\}$ denotes a set of m available channels in a band of interest.

4. The method as recited in claim 1, wherein the available wireless communications channels are from a frequency band specified by one of the IEEE 802.11(a), (b), (g), the 802.15(x), 802.16(x) and 802.20(x) wireless communications standards.

5. A method for determining an assignment of wireless communications channels to a plurality of wireless communications transmitters, comprising:
  determining available wireless communications channels by:
    selecting a first plurality of sets of wireless communications channels from a band of wireless communications frequencies;
    determining a power for each set of the first plurality of sets of wireless communications channels; and
    selecting, from the first plurality of sets of wireless communications channels, two or more sets of wireless communications channels that satisfy power criteria to form a second plurality of sets of wireless communications channels;
  determining candidate channel to transmitter assignments by:
    for each set of the second plurality of sets of wireless communications channels determining two or more assignments of wireless communications channels that are included in said each set to the plurality of wireless communications transmitters;
    for each of the two or more assignments of wireless communications channels for each set of the second plurality of sets of wireless communications channels, determining a channel separation for each of the two or more assignments;
    for each of the two or more assignments of wireless communications channels for each set of the second plurality of sets of wireless communications channels, determining whether the channel separation satisfies a specified separation criteria; and
    when a particular assignment of the two or more assignments of wireless communications channels for each set of the second plurality of sets of wireless communications channels satisfies the specified separation criteria, including the particular assignment in a plurality of candidate channel to transmitter assignments; and
  selecting a channel to transmitter assignment by:
    determining an overall interference generated by each candidate channel to transmitter assignment of the plurality of candidate channel to transmitter assignments; and
    from the plurality of candidate channel to transmitter assignments, choosing the channel to transmitter assignment that reduces the overall interference, based on the overall interference that is determined for each candidate channel to transmitter assignment.

6. An apparatus, comprising:
  means for determining a plurality of available wireless communications channels;
  means for identifying a plurality of wireless communications channel assignments based upon the plurality of available wireless communications channels and a plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;
  means for determining a channel separation for each wireless communications channel assignment of the plurality of wireless communications channel assignments; and
  means for selecting, based on the channel separation that is determined for said each wireless communications channel assignment of the plurality of wireless communications channel assignments, from the plurality of wireless communications channel assignments, a particular wireless communications channel assignment that (a) provides less overall interference relative to other wireless communications channel assignments in the plurality of wireless communications channel assignments and (b) satisfies a channel separation criteria;
  wherein the overall interference for each wireless communications channel assignment considers the interference for each wireless communications channel assigned to each wireless communications transmitter of the plurality of wireless communications transmitters in said each wireless communications channel assignment; and
  wherein determining the channel separation for said each wireless communications channel assignment of the plurality of wireless communications channel assignments includes:
    determining $$S(\overline{S}_{k,i}) = \min_{r=1\ldots n} \left|\overline{S}_{k,i}^r - \overline{S}_{k,i}^{r+1 mod n}\right|$$

wherein:
  $S_k$ is a channel set that includes the plurality of wireless communications channels;
  $\overline{S}_{k,i}$ defines a wireless communications channel assignment i for the channel set $S_k$, by specifying which wireless communications channels of the plurality of wireless communications channels are assigned to each wireless communications transmitter of the plurality of wireless communications transmitters for the wireless communications channel assignment i for the channel set $S_k$;

1<i≦I, in which I is a first number of wireless communications channel assignments in the plurality of wireless communications channel assignments;
n is a second number of wireless communications transmitters in the plurality of wireless communications transmitters; and
$S(\overline{S}_{k,i})$ is a channel separation distance for the wireless communications channel assignment i defined by $\overline{S}_{k,i}$.

7. The apparatus as recited in claim 6, wherein:
the apparatus further comprises means for determining a power for each wireless communications channel assignment in the plurality of wireless communications channel assignments; and
the means for selecting from the plurality of wireless communications channel assignments, a
particular wireless communications channel assignment that (a) provides less overall interference relative to other wireless communications channel assignments in the plurality of wireless communications channel assignments and (b) satisfies a channel separation criteria includes means for:
selecting from the plurality of wireless communications channel assignments, a particular wireless communications channel assignment that provides less overall interference relative to other wireless communications channel assignments in the plurality of wireless communications channel assignments and satisfies a power criteria.

8. The apparatus as recited in claim 7, wherein the means for determining the power for each of the wireless communications channel assignments, further comprises a means for:
determining $$P(S_j) = \min_{\substack{i=1\ldots n \\ k=1\ldots n \\ i \neq k}} |S_j^i - S_j^k|;$$

wherein $S_j^i$ denotes an ith element of a set $S_j$, which is a jth subset of $\Psi$, wherein $\Psi=\{C_1, \ldots, C_m\}$ denotes a set of m available channels in a band of interest.

9. The apparatus as recited in claim 6, wherein the available wireless communications channels are from a frequency band specified by one of the IEEE 802.11(a), (b), (g), the 802.15(x), 802.16(x) and 802.20(x) wireless communications standards.

10. An apparatus, comprising:
means for selecting a first plurality of sets of wireless communications channels from a band of wireless communications frequencies;
means for determining a power for each set of the first plurality of sets of wireless communications channels; and
means for selecting from the first plurality of sets of wireless communications channels, two or more sets of wireless communications channels that satisfy a power criteria to form a second plurality of sets of wireless communications channels;
means for determining two or more assignment of wireless communications channels that are included in said each set to the plurality of wireless communications transmitters, for each set of the second plurality of sets of wireless communications channels;
means for determining a channel separation for each of the two or more assignments, for each of the two or more assignment of wireless communications channels for each set of the second plurality of sets of wireless communications channels,
means for determining whether the channel separation satisfies a specified separation criteria, for each of the two or more assignments of wireless communications channels for each set of the second plurality of sets of wireless communications channels,
means for including a particular assignment in a plurality of candidate channel to transmitter assignments, when the particular assignment of the two or more assignments of wireless communications channels for each set of the second plurality of sets of wireless communications channels satisfies the specified separation criteria;
means for determining an overall interference generated by each candidate channel to transmitter assignment of the plurality of candidate channel to transmitter assignments; and
means for choosing, from the plurality of candidate channel to transmitter assignments, the channel to transmitter assignment that reduces the overall interference, based on the overall interference that is determined for each candidate channel to transmitter assignment.

11. A computer readable medium carrying instructions for determining an assignment of wireless communications channels to a plurality of wireless communications transmitters, which instructions, when executed by one or more processors, cause:
identifying a plurality of available wireless communications channels;
determining a plurality of wireless communications channel assignments based upon the plurality of available wireless communications channels and the plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;
determining a channel separation for each wireless communications channel assignment of the plurality of wireless communications channel assignments; and
based on the channel separation that is determined for said each wireless communications channel assignment of the plurality of wireless communications channel assignments, selecting from the plurality of wireless communications channel assignments, a particular wireless communications channel assignment that (a) provides less interference relative to other wireless communications channel assignments in the plurality of wireless communications channel assignments and (b) satisfies a channel separation criteria;
wherein the overall interference for each wireless communications channel assignment considers the interference for each wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:
determining $$S(\overline{S}_{k,i}) = \min_{r=1\ldots n} |\overline{S}_{k,i}^r - \overline{S}_{k,i}^{r+1 \bmod n}|$$

wherein:
- $S_k$ is a channel set that includes the plurality of wireless communications channels;
- $\overline{S}_{k,i}$ defines a wireless communications channel assignment i for the channel set $S_k$ by specifying which wireless communications channels of the plurality of wireless communications channels are assigned to each wireless communications transmitter of the plurality of wireless communications transmitters for the wireless communications channel assignment i for the channel set $S_k$;
- $1 < i \leq I$, in which I is a first number of wireless communications channel assignments in the plurality of wireless communications channel assignments;
- n is a second number of wireless communications transmitters in the plurality of wireless communications transmitters; and
- $S(\overline{S}_{k,i})$ is a channel separation distance for the wireless communications channel assignment i defined by $\overline{S}_{k,i}$.

12. The computer-readable medium as recited in claim 11, wherein:
the computer-readable medium further comprises additional instructions which, when processed by the one or more processors, causes determining a power for each wireless communications channel assignment in the plurality of wireless communications channel assignments; and
the selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:
selecting from the plurality of wireless communications channel assignments, a particular wireless communications channel assignment that provides less overall interference relative to other wireless communications channel assignments in the plurality of wireless communications channel assignments and satisfies a power criteria.

13. The computer-readable medium as recited in claim 12, wherein determining the power for each of the wireless communications channel assignments, further comprises:
determining $$P(S_j) = \min_{\substack{i=1\ldots n \\ k=1\ldots n \\ i \neq k}} |S_j^i - S_j^k|;$$

wherein $S_j^i$ denotes an ith element of a set $S_j$, which is a jth subset of $\Psi$, wherein $\Psi = \{C_1, \ldots, C_m\}$ denotes a set of m available channels in a band of interest.

14. The computer-readable medium as recited in claim 11, wherein the available wireless communications channels are from a frequency band specified by one of the IEEE 802.11 (a), (b), (g), the 802.15(x), 802.16(x) and 802.20(x) wireless communications standards.

15. A computer-readable medium carrying one or more sequences of instructions for determining an assignment of wireless communications channels to a plurality of wireless communications transmitters, which instructions, when executed by one or more processors, cause the one or more processors to carry out the steps of:
determining available wireless communications channels by:
selecting a first plurality of sets of wireless communications channels from a band of wireless communications frequencies;
determining a power for each set of the first plurality of sets of wireless communications channels; and
selecting, from the first plurality of sets of wireless communications channels, two or more sets of wireless communications channels that satisfy power criteria to form a second plurality of sets of wireless communications channels;
determining candidate channel to transmitter assignments by:
for each set of the second plurality of sets of wireless communications channels determining two or more assignments of wireless communications channels that are included in said each set to the plurality of wireless communications transmitters;
for each of the two or more assignments of wireless communications channels for each set of the second plurality of sets of wireless communications channels, determining a channel separation for each of the two or more assignments;
for each of the two or more assignments of wireless communications channels for each set of the second plurality of sets of wireless communications channels, determining whether the channel separation satisfies a specified separation criteria; and
when a particular assignment of the two or more assignments of wireless communications channels for each set of the second plurality of sets of wireless communications channels satisfies the specified separation criteria, including the particular assignment in a plurality of candidate channel to transmitter assignments; and
selecting a channel to transmitter assignment by:
determining an overall interference generated by each candidate channel to transmitter assignment of the plurality of candidate channel to transmitter assignments; and
from the plurality of candidate channel to transmitter assignments, choosing the channel to transmitter assignment that reduces the overall interference, based on the overall interference that is determined for each candidate channel to transmitter assignment.

16. An apparatus for determining an assignment of wireless communications channels to a plurality of wireless communications transmitters, the apparatus comprising:
a memory to store instructions; and
one or more processors configured to execute the instructions, the instructions causing the one or more processors to:
identify a plurality of available wireless communications channels;

determine a plurality of wireless communications channel assignments based upon the plurality of available wireless communications channels and the plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;

determine a channel separation for each wireless communications channel assignment of the plurality of wireless communications channel assignments; and based on the channel separation that is determined for said each wireless communications channel assignment of the plurality of wireless communications channel assignments, select from the plurality of wireless communications channel assignments, a particular wireless communications channel assignment that (a) provides less overall interference relative to other wireless communications channel assignments in the plurality of wireless communications channel assignments and (b) satisfies a channel separation criteria;

wherein the overall interference for each wireless communications channel assignment considers the interference for each wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:

determining $$S(\overline{S}_{k,i}) = \min_{r=1...n} |\overline{S}^r_{k,i} - \overline{S}^{r+1 mod n}_{k,i}|$$

wherein:
- $S_k$ is a channel set that includes the plurality of wireless communications channels;
- $\overline{S}_{k,i}$ defines a wireless communications channel assignment i for the channel set $S_k$ by specifying which wireless communications channels of the plurality of wireless communications channels are assigned to each wireless communications transmitter of the plurality of wireless communications transmitters for the wireless communications channel assignment i for the channel set $S_k$;
- $1 < i \leq I$, in which I is a first number of wireless communications channel assignments in the plurality of wireless communications channel assignments;
- n is a second number of wireless communications transmitters in the plurality of wireless communications transmitters; and
- $S(\overline{S}_{k,i})$ is a channel separation distance for the wireless communications channel assignment i defined by $\overline{S}_{k,i}$.

17. The apparatus as recited in claim 16, wherein:
the memory stores additional instructions which, when executed by the one or more processors, causes the processor to determine a power for each wireless communications channel assignment in the plurality of wireless communications channel assignments; and
the selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:
selecting from the plurality of wireless communications channel assignments, a particular wireless communications channel assignment that provides less overall interference relative to other wireless communications channel assignments in the plurality of wireless communications channel assignments criteria and satisfies a power criteria.

18. The apparatus as recited in claim 17, wherein determining the power for each of the wireless communications channel assignments, further comprises:
determining $$P(S_j) = \min_{\substack{i=1...n \\ k=1...n \\ i \neq k}} |S^i_j - S^k_j|;$$

wherein $S^i_j$ denotes an ith element of a set $S_j$, which is a jth subset of $\Psi$, wherein $\Psi = \{C_1, \ldots, C_m\}$ denotes a set of m available channels in a band of interest.

19. The apparatus as recited in claim 16, wherein the available wireless communications channels are from a frequency band specified by one of the IEEE 802.38(a), (b), (g), the 802.15(x), 802.16(x) and 802.20(x) wireless communications standards.

20. An apparatus for determining an assignment of wireless communications channels to a plurality of wireless communications transmitters, the apparatus comprising:
a memory to store instructions: and
one or more processors configured to execute the instructions, the instructions causing the one or more processors to:
determine available wireless communications channels by:
selecting a first plurality of sets of wireless communications channels from a band of wireless communications frequencies;
determining a power for each set of the first plurality of sets of wireless communications channels; and
selecting, from the first plurality of sets of wireless communications channels, two or more sets of wireless communications channels that satisfy power criteria to form a second plurality of sets of wireless communications channels;
determine candidate channel to transmitter assignments by:
for each set of the second plurality of sets of wireless communications channels determining two or more assignments of wireless communications channels that are included in said each set to the plurality of wireless communications transmitters;
for each of the two or more assignments of wireless communications channels for each set of the second plurality of sets of wireless communications channels, determining a channel separation for each of the two or more assignments;
for each of the two or more assignments of wireless communications channels for each set of the second plurality of sets of wireless communications channels, determining whether the channel separation satisfies a specified separation criteria; and when a particular assignment of the two or more assignments of wireless communications channels for each set of the second plurality of sets of wireless communications channels satisfies the specified separation criteria, including the particular assignment in a plurality of candidate channel to transmitter assignments; and select a channel to transmitter assignment by:

determining an overall interference generated by each candidate channel to transmitter assignment of the plurality of candidate channel to transmitter assignments; and from the plurality of candidate channel to transmitter assignments, choosing the channel to transmitter assignment that reduces the overall interference, based on the overall interference that is determined for each candidate channel to transmitter assignment.

21. A method for determining an assignment of wireless communications channels to a plurality of wireless communications transmitters, comprising:

identifying a plurality of available wireless communications channels;

determining a plurality of wireless communications channel assignments based upon the plurality of available wireless communications channels and the plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;

determining a channel separation for each wireless communications channel assignment of the plurality of wireless communications channel assignments; and based on the channel separation that is determined for said each wireless communications channel assignment of the plurality of wireless communications channel assignments, selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria;

wherein the overall interference for each wireless communications channel assignment considers the interference for wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:

determining $$S(\overline{S}_{k,i}) = \min_{r=1,\ldots,n} |\overline{S}_{k,i}^r - \overline{S}_{k,i}^{r+1}|$$

wherein:

$S_k$ is a channel set that includes the plurality of wireless communications channels;

$\overline{S}_{k,i}$ defines a wireless communications channel assignment i for the channel set $S_k$, by specifying which wireless communications channels of the plurality of wireless communications channels are assigned to each wireless communications transmitter of the plurality of wireless communications transmitters for the wireless communications channel assignment I for the channel set $S_k$;

$1 < i \leq I$, in which I is a first number of wireless communications channel assignments in the plurality of wireless communications channel assignments;

n is a second number of wireless communications transmitters in the plurality of wireless communications transmitters; and $S(\overline{S}_{k,i})$ is a channel separation distance for the wireless communications channel assignment i defined by $\overline{S}_{k,i}$.

22. The method as recited in claim 21, wherein:

the method further comprises determining a power for each wireless communications channel assignment in the plurality of wireless communications channel assignments; and the selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:

selecting from the plurality of wireless communications channel assignments, a particular wireless communications channel assignment that provides less overall interference relative to other wireless communications channel assignments in the plurality of wireless communications channel assignments and satisfies a power criteria.

23. The method as recited in claim 22, wherein determining the power for each of the wireless communications channel assignments, further comprises:

determining $$P(S_j) = \min_{\substack{i=1\ldots n \\ k=1\ldots n \\ i \neq k}} |S_j^i - S_j^k|;$$

wherein $S_j^i$ denotes an ith element of a set $S_j$, which is a jth subset of $\Psi$, wherein $\Psi = \{C_1, \ldots, C_m\}$ denotes a set of m available channels in a band of interest.

24. The method as recited in claim 21, wherein the available wireless communications channels are from a frequency band specified by one of the IEEE 802.11(a), (b), (g), the 802.15(x), 802.16(x) and 802.20(x) wireless communications standards.

25. A computer-readable medium for determining an assignment of wireless communications channels to a plurality of wireless communications transmitters, the computer-readable medium carrying instructions which, when processed by one or more processors, causes:

identifying a plurality of available wireless communications channels;

determining a plurality of wireless communications channel assignments based upon the plurality of available wireless communications channels and the plurality of wireless communications transmitters, wherein each wireless communications channel assignment from the plurality of wireless communications channel assignments includes an assignment of one or more wireless communications channels of the plurality of available wireless communications channels to wireless communications transmitter of the plurality of wireless communications transmitters;

determining a channel separation for each wireless communications channel assignment of the plurality of wireless communications channel assignments; and based on the channel separation that is determined for said each wireless communications channel assignment of the plurality of wireless communications channel assignments, selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria;

wherein the overall interference for each wireless communications channel assignment considers the interference for each wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:
determining $$S(\overline{S}_{k,i}) = \min_{r=1,\dots,n} \left| \overline{S}_{k,i}^r - \overline{S}_{k,i}^{r+1} \right|$$

wherein:
$S_k$ is a channel set that includes the plurality of wireless communications channels;
$\overline{S}_{k,i}$ defines a wireless communications channel assignment i for the channel set $S_k$, by specifying which wireless communications channels of the plurality of wireless communications channels are assigned to each wireless communications transmitter of the plurality of wireless communications transmitters for the wireless communications channel assignment i for the channel set $S_k$;
$1 < i \leq I$, in which I is a first number of wireless communications channel assignments in the plurality of wireless communications channel assignments;
n is a second number of wireless communications transmitters in the plurality of wireless communications transmitters; and
$S(\overline{S}_{k,i})$ is a channel separation distance for the wireless communications channel assignment i defined by $\overline{S}_{k,i}$.

26. The computer-readable medium as recited in claim 25, wherein:
the computer-readable medium further comprises additional instructions which, when processed by the one or more processors, causes determining a power for each wireless communications channel assignment in the plurality of wireless communications channel assignments; and the selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:
selecting from the plurality of wireless communications channel assignments, a particular wireless communications channel assignment that provides less overall interference relative to other wireless communications channel assignments in the plurality of wireless communications channel assignments and satisfies a power criteria.

27. The computer-readable medium as recited in claim 26, wherein determining the power for each of the wireless communications channel assignments, further comprises:
determining $$P(S_j) = \min_{\substack{i=1\dots n \\ k=1\dots n \\ i \neq k}} |S_j^i - S_j^k|;$$

wherein $S_j^i$ denotes an ith element of a set $S_j$, which is a jth subset of $\Psi$, wherein $\Psi=\{C_1, \dots, C_m\}$ denotes a set of m available channels in a band of interest.

28. The computer-readable medium as recited in claim 25, wherein the available wireless communications channels are from a frequency band specified by one of the IEEE 802.11 (a), (b), (g), the 802.15(x), 802.16(x) and 802.20(x) wireless communications standards.

29. An apparatus for determining an assignment of wireless communications channels to a plurality of wireless communications transmitters, the apparatus comprising:
a memory to store instructions; and
one or more processors configured to execute the instructions, the instructions causing the
one or more processors to:
identify a plurality of available wireless communications channels;
determine a plurality of wireless communications channel assignments based upon the plurality of available wireless communications channels and the plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;
determine a channel separation for each wireless communications channel assignment of the plurality of wireless communications channel assignments; and
based on the channel separation that is determined for said each wireless communications channel assignment of the plurality of wireless communications channel assignments, select from the plurality of wireless communications channel assignments, a particular wireless communications channel assignment that (a) provides less overall interference relative to other wireless communications channel assignments in the plurality of wireless communications channel assignments and (b) satisfies a channel separation criteria;

wherein the overall interference for each wireless communications channel assignment considers the interference for each wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:

determining:

$$S(\overline{S}_{k,i}) = \min_{r=1,\ldots,n} |\overline{S}^r_{k,i} - \overline{S}^{r+1}_{k,i}|$$

wherein:
- $S_k$ is a channel set that includes the plurality of wireless communications channels;
- $\overline{S}_{k,i}$ defines a wireless communications channel assignment i for the channel set $S_k$ by specifying which wireless communications channels of the plurality of wireless communications channels are assigned to each wireless communications transmitter of the plurality of wireless communications transmitters for the wireless communications channel assignment i for the channel set $S_k$;
- $1 < i \leq I$, in which I is a first number of wireless communications channel assignments in the plurality of wireless communications channel assignments;
- n is a second number of wireless communications transmitters in the plurality of wireless communications transmitters; and
- $S(\overline{S}_{k,i})$ is a channel separation distance for the wireless communications channel assignment i defined by $\overline{S}_{k,i}$.

30. The apparatus as recited in claim 29, wherein:
the memory further stores additional instructions which, when executed by the one or more processors, causes the one or more processors to determine a power for each wireless communications channel assignment in the plurality of wireless communications channel assignments; and the selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:

selecting from the plurality of wireless communications channel assignments, a particular wireless communications channel assignment that provides less overall interference relative to other wireless communications channel assignments in the plurality of wireless communications channel assignments and satisfies a power criteria.

31. The apparatus as recited in claim 30, wherein determining the power for each of the wireless communications channel assignments, further comprises:

determining $$P(S_j) = \min_{\substack{i=1\ldots n \\ k=1\ldots n \\ i \neq k}} |S^i_j - S^k_j|;$$

wherein $S^i_j$ denotes an ith element of a set $S_j$ which is a jth subset of $\Psi$, wherein $\Psi = \{C_1, \ldots, C_m\}$ denotes a set of m available channels in a band of interest.

32. The apparatus as recited in claim 29, wherein the available wireless communications channels are from a frequency band specified by one of the IEEE 802.11(a), (b), (g), the 802.15(x), 802.16(x) and 802.20(x) wireless communications standards.

33. An apparatus for determining an assignment of wireless communications channels to a plurality of wireless communications transmitters, the apparatus comprising:

means for identifying a plurality of available wireless communications channels;

means for determining a plurality of wireless communications channel assignments based upon the plurality of available wireless communications channels and in the plurality of wireless communications transmitters, wherein each wireless communications channel assignment from the plurality of wireless communications channel assignments includes an assignment of one or more wireless communications channels of the plurality of available wireless communications channels to each wireless communications transmitter of the plurality of wireless communications transmitters;

means for determining a channel separation for each wireless communications channel assignment of the plurality of wireless communications channel assignments; and means for selecting, based on the channel separation that is determined for said each wireless communications channel assignment of the plurality of wireless communications channel assignments, from the plurality of wireless communications channel assignments, a particular wireless communications channel assignment that (a) provides less overall interference relative to other wireless communications channel assignments in the plurality of wireless communications channel assignments and (b) satisfies a channel separation criteria;

wherein the overall interference for each wireless communications channel assignment considers the interference for each wireless communications channel assigned to each wireless communications transmitter of the plurality of wireless communications transmitters in said each wireless communications channel assignment; and wherein determining the channel separation for said each wireless communications channel assignment of the plurality of wireless communications channel assignments includes:

means for determining $$S(\overline{S}_{k,i}) = \min_{r=1,\ldots,n} |\overline{S}^r_{k,i} - \overline{S}^{r+1}_{k,i}|$$

wherein:
- $S_k$ is a channel set that includes the plurality of wireless communications channels;
- $\overline{S}_{k,i}$ defines a wireless communications channel assignment i for the channel set $S_k$ by specifying which wireless communications channels of the plurality of wireless communications channels are assigned to each wireless communications transmitter of the plurality of wireless communications transmitters for the wireless communications channel assignment i for the channel set $S_k$;

1 < i ≦ I, in which I is a first number of wireless communications channel assignments in the plurality of wireless communications channel assignments;

n is a second number of wireless communications transmitters in the plurality of wireless communications transmitters; and $S(\overline{S}_{k,i})$ is a channel separation distance for the wireless communications channel assignment i defined by $\overline{S}_{k,i}$.

34. The apparatus as recited in claim 33, wherein:

the apparatus further comprises means for determining a power for each wireless communications channel assignment in the plurality of wireless communications channel assignments; and the means for selecting from the plurality of wireless communications channel assignments, a particular wireless communications channel assignment that (a) provides less overall interference relative to other wireless communications channel assignments in the plurality of wireless communications channel assignments and (b) satisfies a channel separation criteria includes:

means for selecting from the plurality of wireless communications channel assignments, a particular wireless communications channel assignment that provides less overall interference relative to other wireless communications channel assignments in the plurality of wireless communications channel assignments and satisfies a power criteria.

35. The apparatus as recited in claim 34, wherein the means for determining the power for each of the wireless communications channel assignments, further comprises means for: determining $$P(S_j) = \min_{\substack{i=1\ldots n \\ k=1\ldots n \\ i \neq k}} |S_j^i - S_j^k|;$$

wherein $S_j^i$ denotes an ith element of a set $S_j$ which is a jth subset of $\Psi$, wherein $\Psi = \{C_1, \ldots, C_m\}$ denotes a set of m available channels in a band of interest.

36. The apparatus as recited in claim 33, wherein the available wireless communications channels are from a frequency band specified by one of the IEEE 802.11(a), (b), (g), the 802.15(x), 802.16(x) and 802.20(x) wireless communications standards.

* * * * *